(12) United States Patent
Kusumi et al.

(10) Patent No.: US 9,250,057 B2
(45) Date of Patent: Feb. 2, 2016

(54) DISPLACEMENT DETECTION APPARATUS

(71) Applicant: MORI SEIKI CO., LTD., Yamato-Koriyama, Nara (JP)

(72) Inventors: Masaaki Kusumi, Isehara (JP); Daisuke Uchiyama, Isehara (JP)

(73) Assignee: MORI SEIKI CO., LTD., Yamato-Koriyama (JP)

(*) Notice: Subject to any disclaimer, the term of this patent is extended or adjusted under 35 U.S.C. 154(b) by 154 days.

(21) Appl. No.: 14/036,573

(22) Filed: Sep. 25, 2013

(65) Prior Publication Data

US 2014/0103914 A1 Apr. 17, 2014

(30) Foreign Application Priority Data

Oct. 12, 2012 (JP) ................................ 2012-226601

(51) Int. Cl.
*G01B 7/14* (2006.01)
*G01D 5/38* (2006.01)
*G11B 3/00* (2006.01)
*G01D 5/245* (2006.01)

(52) U.S. Cl.
CPC .. *G01B 7/14* (2013.01); *G01D 5/38* (2013.01); *G01D 5/2457* (2013.01); *G11B 3/00* (2013.01); *G11B 2209/00* (2013.01); *G11B 2220/00* (2013.01)

(58) Field of Classification Search
CPC .. G11B 3/00; G11B 2209/00; G11B 2220/00; G01D 1/00; H01F 1/00
USPC ..................................................... 324/207.21
See application file for complete search history.

(56) References Cited

U.S. PATENT DOCUMENTS

| | | | |
|---|---|---|---|
| 5,247,165 A | 9/1993 | Hiruta et al. | |
| 5,309,624 A * | 5/1994 | Nishikawa | G11B 5/4813 29/603.03 |
| 5,956,140 A * | 9/1999 | Ishizuka | G01D 5/38 250/237 G |
| 2001/0003422 A1* | 6/2001 | Andermo et al. | 324/207.17 |
| 2002/0014581 A1* | 2/2002 | Yamamoto | G01D 5/34715 250/231.13 |
| 2004/0089796 A1* | 5/2004 | Patzwald et al. | 250/231.1 |
| 2004/0217268 A1* | 11/2004 | Tobiason et al. | 250/231.13 |
| 2009/0033946 A1* | 2/2009 | Kon | G01D 5/58 356/499 |

FOREIGN PATENT DOCUMENTS

JP A-5-89480 4/1993

* cited by examiner

*Primary Examiner* — Huy Q Phan
*Assistant Examiner* — Temilade Rhodes-Vivour
(74) *Attorney, Agent, or Firm* — Oliff PLC

(57) ABSTRACT

A displacement detection apparatus includes a scale unit and a detection head unit. The scale unit has a reference track unit and sub-track units, the pitch directions of these units being different from one another. The detection head unit has three or more detection units configured to read scales of the reference track unit and the sub-track units and to output signals in accordance with the read scales. The three detection units detect displacement in two orthogonal directions on a plane parallel to a plane along which the detection head unit moves.

6 Claims, 13 Drawing Sheets

DISPLACEMENT DETECTION APPARATUS

CROSS REFERENCES TO RELATED APPLICATIONS

The present invention contains subject matter related to Japanese Patent Applications JP2012-226601, filed in the Japanese Patent Office on Oct. 12, 2012, respectively, the entire contents of which being incorporated herein by reference.

BACKGROUND OF THE INVENTION

1. Field of the Invention

The present invention relates to a displacement detection apparatus used to detect linear displacement, rotational displacement, etc., in a machine tool, an industrial machine, a robot, etc., and particularly relates to a displacement detection apparatus configured to detect displacement in a plurality of directions.

2. Description of the Related Art

Conventionally, a displacement detection apparatus is used to detect an amount of linear movement, a linear position, an amount of rotational movement, and a rotation angle for intended purposes, such as positioning, controlling, and displaying a position of a machine tool, an industrial machine, a robot, etc. In recent years, a displacement detection apparatus capable of detecting a positional deviation of a uniaxial moving stage, that is, an amount of displacement in a plurality of directions is demanded.

As a displacement detection apparatus capable of detecting an amount of displacement in a plurality of directions, for example, the one described in Patent Literature 1 is known. This displacement detection apparatus has a magnetic scale on which a first magnetized part magnetized as an N pole and a second magnetized part magnetized as an S pole are sequentially arranged alternately on a two-dimensional plane, and a magneto-electric converting device that moves on the magnetic scale. Then, on the magnetic scale, a two-dimensional magnetic grating is formed by the first magnetized part and the second magnetized part.

[Patent Literature 1] Japanese Patent Laid-Open No. 1993-89480

SUMMARY OF THE INVENTION

However, in the conventional displacement detection apparatus described in Patent Literature 1, when the magneto-electric converting device, which is a detection head unit, is disposed between the first magnetized part and the second magnetized part, the output of a signal obtained by the magneto-electric converting device is reduced. Thus, there is such a problem that it is difficult to accurately detect linear displacement, rotational displacement, etc.

An object of the present invention is to provide a displacement detection apparatus capable of accurately detecting displacement in a plurality of directions.

In order to solve the above-mentioned problem and to achieve the object of the present invention, a displacement detection apparatus of the present invention includes a scale unit and a detection head unit.

The scale unit has a measurement plane provided with at least two track units each having a scale whose repetition pitch is constant. The pitch directions, in each of which the repetition pitch is the shortest, are different from one another in the at least two track units.

The detection head unit has at least three or more detection units each configured to read the scale and to output a signal in accordance with the read scale.

One of the at least two track units is a reference track unit. For the reference track unit, at least one detection unit is disposed in opposition thereto. The remaining track unit(s) of the at least two track units is a sub-track unit. For the sub-track unit, at least one detection unit is disposed in opposition thereto.

Then, when the scale unit and the detection head unit move relatively along the measurement plane of the scale unit, the at least three or more detection units detect displacement in two orthogonal directions on a plane parallel to the plane along which the detection head unit moves.

As described above, the scale unit is provided with the track units whose pitch directions are different from each other, and for each of the track units, at least one or more detection units are disposed in opposition thereto. This makes it possible to prevent the signal output obtained by the detection unit from reducing, and to accurately detect displacement in a plurality of directions.

According to the displacement detection apparatus of the present invention, it is possible to accurately detect an amount of displacement in the relative movement direction of the detection head unit and the scale unit.

DESCRIPTION OF THE PREFERRED EMBODIMENTS

Hereinafter, displacement detection apparatuses of embodiment examples of the present invention are explained with reference to FIG. 1 to FIG. 18. In each drawing, the same symbol is attached to the common member. The present invention is not limited to the following embodiments.

1. First Embodiment Example

First, a configuration of a displacement detection apparatus of a first embodiment example (hereinafter, referred to as the "present example") of the present invention is explained in accordance with FIG. 1 to FIG. 6.

1-1. Configuration Example of Displacement Detection Apparatus

Figure 1:
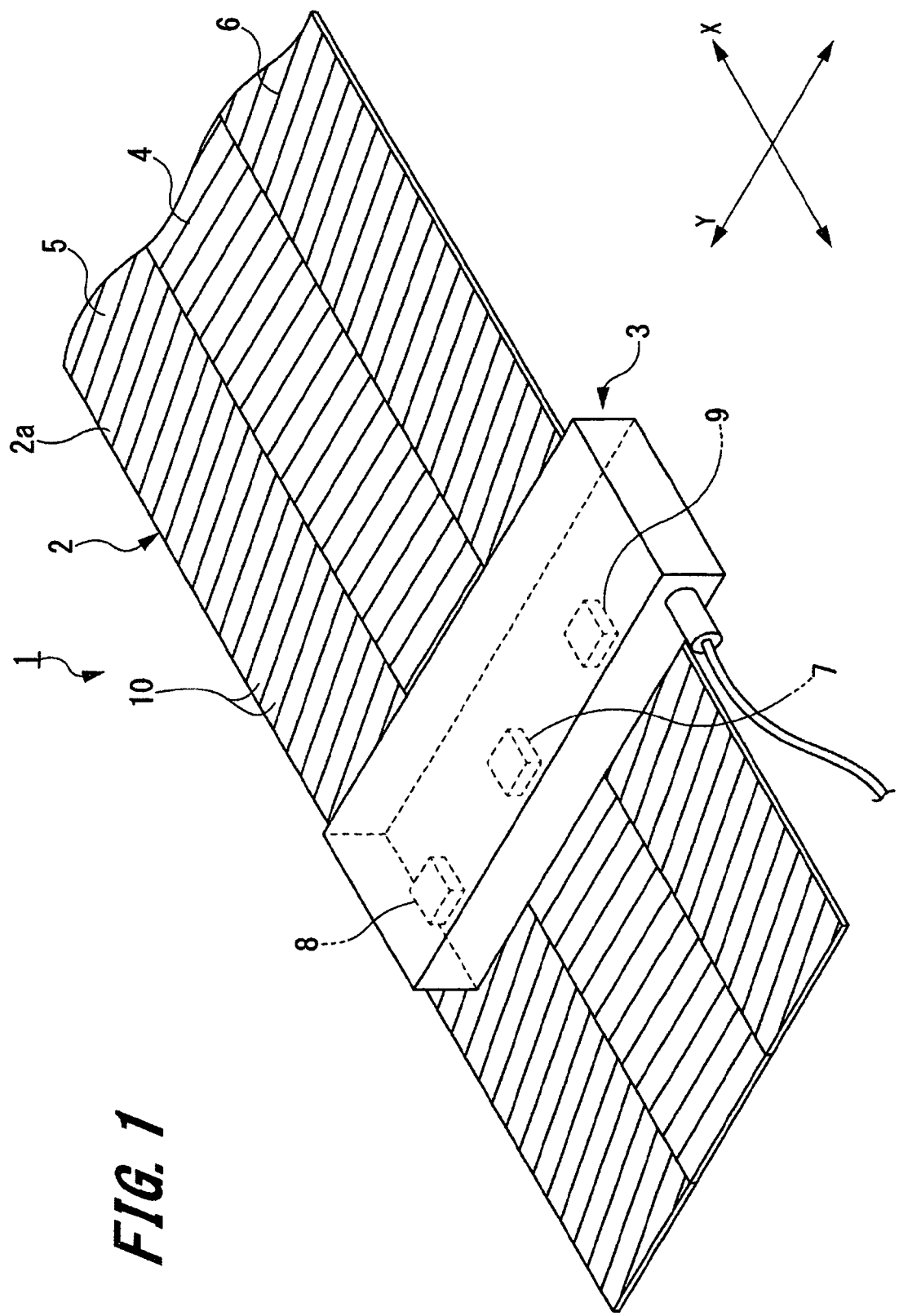
FIG. 1 is a perspective view showing a displacement detection apparatus in a first embodiment example of the present invention.
Figure 2:
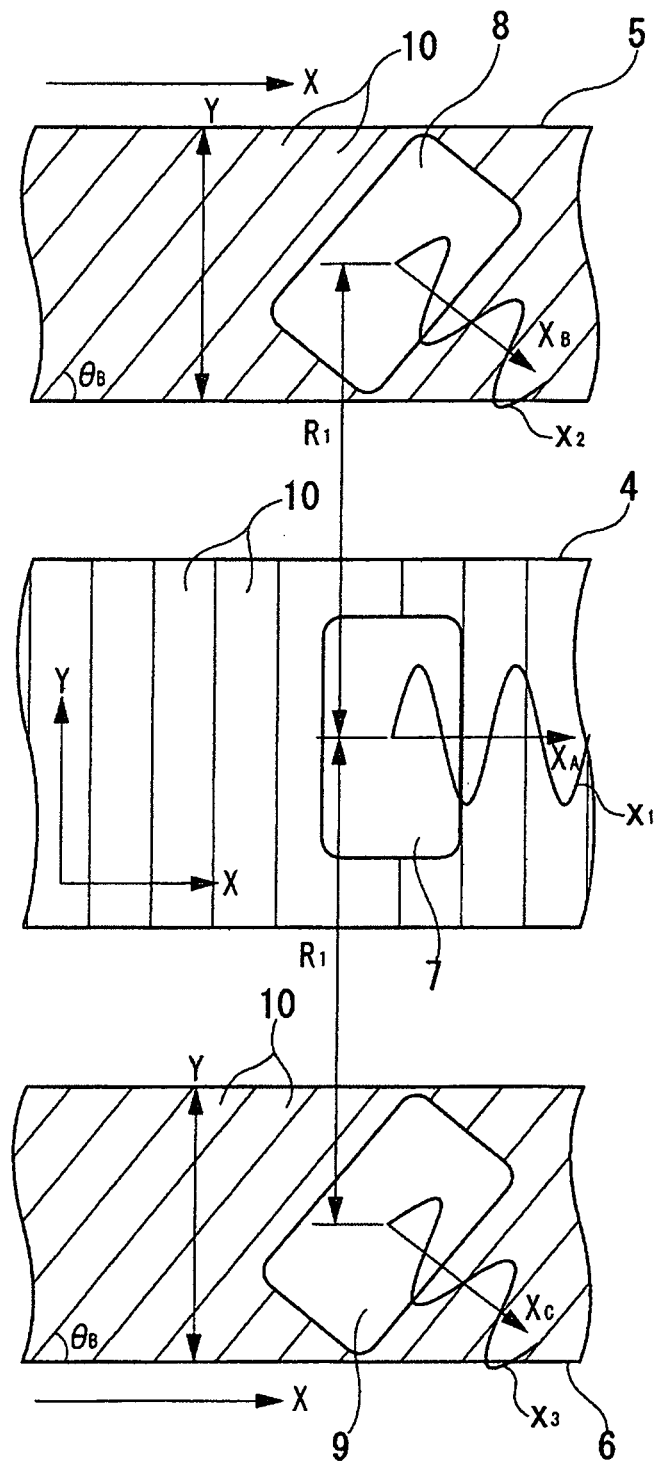
FIG. 2 is an explanatory diagram showing essential parts of the displacement detection apparatus in the first embodiment example of the present invention.

FIG. 1 is a perspective view showing a configuration of a displacement detection apparatus and FIG. 2 is an explanatory diagram showing essential parts of the displacement detection apparatus.

A displacement detection apparatus 1 of the present example is configured as a so-called linear displacement measurement apparatus adopting the magnetic detection principles and configured to measure linear displacement in a plurality of directions. As shown in FIG. 1, the displacement detection apparatus 1 includes a scale unit 2 and a detection head unit 3.

[Scale Unit]

The scale unit 2 is formed into the shape of substantially a flat plate. For the scale unit 2, the detection head unit 3 is disposed in opposition to a measurement plane 2a. The scale unit 2 and the detection head unit 3 move relatively along the measurement plane 2a of the scale unit 2. In the present example, the detection head unit 3 moves in a first direction X, which is the longitudinal direction of the scale unit 2, along the measurement plane 2a. The direction orthogonal to the first direction X in the plane along which the detection head unit 3 moves is defined as a second direction Y (the widthwise direction of the scale unit 2).

As shown in FIG. 2, on the measurement plane 2a of the scale unit 2, a reference track unit 4, a first sub-track unit 5, and a second sub-track unit 6 are provided. The reference track unit 4 is disposed between the first sub-track unit 5 and the second sub-track unit 6.

On the three track units 4 to 6, a magnetic pattern 10 that serves as a scale is arranged. The magnetic pattern 10 is formed by magnetically recording the N pole and the S pole alternately and the repetition pitch of the N pole and the S pole is set constant.

A first pitch direction $X_A$, which is the direction in which the repetition pitch of the reference track unit 4 is the shortest, is set substantially parallel to the first direction X. Second and third pitch directions $X_B$, and $X_C$, which are the directions in which the repetition pitches of the first sub-track unit 5 and the second sub-track unit 6 are the shortest, respectively, are set in the same direction. The second and third pitch directions $X_B$ and $X_C$ are inclined at a predetermined angle $\theta_B$ with respect to the first direction X and the second direction Y in the plane along which the detection head unit 3 moves and are set in directions different from the first pitch direction $X_A$.

[Detection Head Unit]

The detection head unit 3 has a first detection unit 7, a second detection unit 8, and a third detection unit 9. The first detection unit 7, the second detection unit 8, and the third detection unit 9 are each formed into substantially the rectangular shape. The first detection unit 7 is located substantially at the center of the detection head unit 3, disposed between the second detection unit 8 and the third detection unit 9, and disposed in opposition to the reference track unit 4. The second detection unit 8 is disposed in opposition to the first sub-track unit 5 and the third detection unit 9 is disposed in opposition to the second sub-track unit 6.

Further, a length $R_1$ from the center of the first detection unit 7 to the center of the second detection unit 8 is set substantially equal to a length $R_1$ from the center of the first detection unit 7 to the center of the third detection unit 9. It may also be possible to set the length $R_1$ from the center of the first detection unit 7 to the center of the second detection unit 8 different from the length $R_1$ from the first detection unit 7 to the third detection unit 9.

As the first detection unit 7, the second detection unit 8, and the third detection unit 9, it is possible to apply, for example, an MR device configured to detect a magnetic field by utilizing the magneto-resistive effect. Detailed configurations of the first detection unit 7, the second detection unit 8, and the third detection unit 9 will be described later.

The first detection unit 7 detects displacement only in the first pitch direction $X_A$. As described above, the first pitch direction $X_A$ and the first direction X are parallel, and therefore, the first detection unit 7 detects a signal $x_1$ only in the first direction X.

The second detection unit 8 detects a signal $x_2$ only in the second pitch direction $X_B$ of the first sub-track unit 5 and the third detection unit 9 detects a signal $x_3$ only in the third pitch direction $X_C$ of the second sub-track unit 6. Here, the second and third pitch directions $X_B$ and $X_C$ are inclined at the predetermined angle $\theta_B$ with respect to the first direction X and the second direction Y. Hence, the second detection unit 8 and the third detection unit 9 detect signals for the movement both in the first direction X and in the second direction Y in the detection head unit 3.

Figure 3:
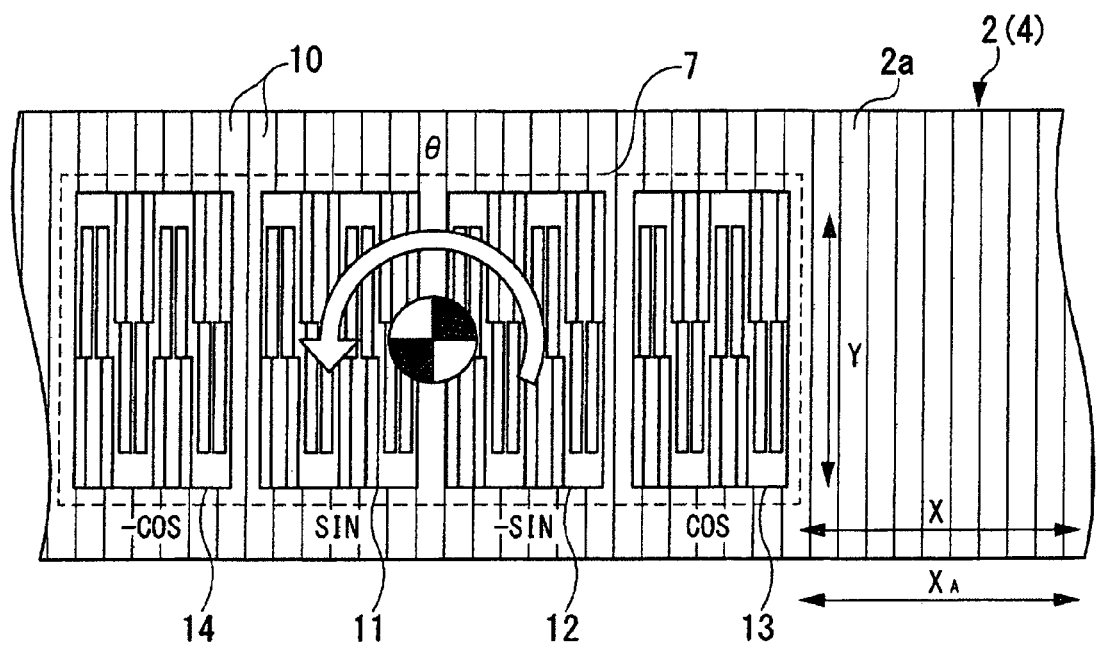
FIG. 3 is an explanatory diagram showing a detection unit of the displacement detection apparatus in the first embodiment example of the present invention.
Figure 4:
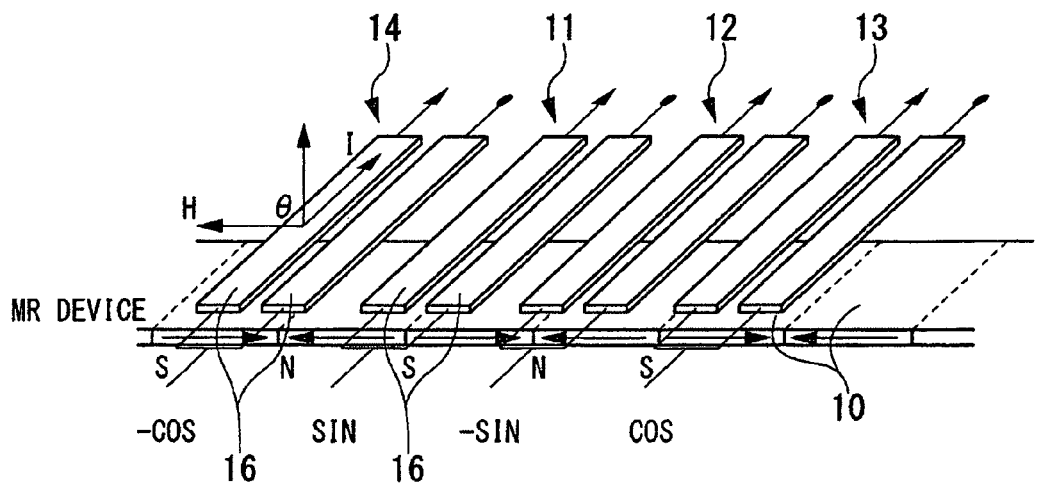
FIG. 4 is an explanatory diagram showing a circuit configuration of the detection unit shown in FIG. 3.
Figure 5:
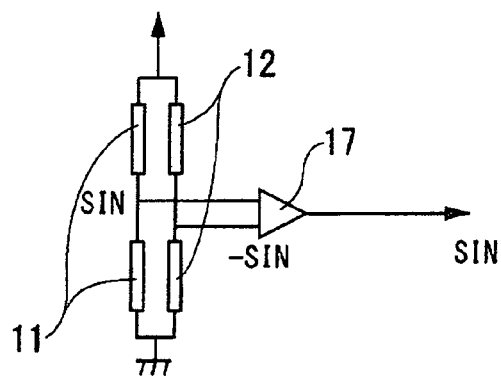
FIG. 5 is an explanatory diagram showing a first detection device unit and a second detection device unit configuring the detection unit.

Next, with reference to FIG. 3 to FIG. 5, detailed configurations of the first detection unit 7, the second detection unit 8, and the third detection unit 9 of the detection head unit 3 are explained. The first detection unit 7, the second detection unit 8, and the third detection unit 9 have the same detection principles and configuration, and therefore, here, the first detection unit 7 is explained.

FIG. 3 is an outline configuration diagram showing the first detection unit 7 and FIG. 4 is an explanatory diagram showing a circuit configuration of the first detection unit 7.

As shown in FIG. 3, the first detection unit 7 has a first detection device unit 11 configured to obtain a sin signal, a second detection device unit 12 configured to obtain a −sin signal, a third detection device unit 13 configured to obtain a cos signal, and a fourth detection device unit 14 configured to obtain a −cos signal. The first detection device unit 11 to the fourth detection device unit 14 are each formed into substantially the rectangular shape.

The first detection device unit 11, the second detection device unit 12, the third detection device unit 13, and the fourth detection device unit 14 in the first detection unit 7 are arranged side by side along the first pitch direction $X_A$. In the second detection unit 8, the first detection device unit 11 to the fourth detection device unit 14 are arranged side by side along the second pitch direction $X_B$. In the third detection unit 9, the first detection device unit 11 to the fourth detection device unit 14 are arranged side by side along the third pitch direction $X_C$.

The third detection device unit 13 and the fourth detection device unit 14 are disposed at both ends in the first pitch direction $X_A$ in the first detection unit 7. Then, the first detection device unit 11 and the second detection device unit 12 are disposed between the third detection device unit 13 and the fourth detection device unit 14.

By the first detection device unit 11 to the fourth detection device unit 14, it is possible to cancel rotation about an axis orthogonal to the measurement plane 2a of the scale unit 2 in the first detection unit 7 and inclination between the first detection unit 7 and the measurement plane 2a of the scale unit 2.

In the second detection unit 8, the third detection device unit 13 and the fourth detection device unit 14 are disposed at both ends in the second pitch direction $X_B$ in the second detection unit 8. Then, in the third detection unit 9, the third detection device unit 13 and the fourth detection device unit 14 are disposed at both ends in the third pitch direction $X_C$ in the third detection unit 9.

As shown in FIG. 4, the first detection device unit 11 to the fourth detection device unit 14 are each configured by a plurality of MR devices (magneto-resistive effect devices) 16. The MR device 16 is a device whose resistance value changes in accordance with a magnetic field strength H.

The MR devices 16 are each formed into the shape of substantially a rectangular strip and as shown in FIG. 3, are arranged so that the longitudinal direction thereof is along the longitudinal direction of the magnetic pattern 10. As shown in FIG. 4, the MR device 16 detects the magnetic field strength H in the widthwise direction of the magnetic pattern 10, that is, in the direction in which a plurality of the magnetic patterns 10 neighbors to one another. Thereby, the first detection unit 7 having a plurality of the MR devices 16 detects only an amount of displacement in the widthwise direction of the magnetic pattern 10, that is, the direction in which the repetition pitch is the shortest.

The magnetic field strength in the widthwise direction in the magnetic pattern 10 becomes maximum at the boundary between the S pole and the N pole and becomes minimum on the S pole and on the N pole. Thus, the resistance value of the MR device 16 becomes minimum at the boundary between the S pole and the N pole and becomes maximum on the S pole and on the N pole. In the present example, in order to magnify a signal to be detected, a plurality of the MR devices 16 is provided.

FIG. 5 is an explanatory diagram showing the first detection device unit 11 and the second detection device unit 12.

As shown in FIG. 5, the first detection device unit 11 configured to obtain a sin signal and the second detection device unit 12 configured to obtain a −sin signal are connected to a first differential amplifier 17. Then, signals obtained by the first detection device unit 11 and the second detection device unit 12 are differentially amplified by the first differential amplifier 17 and output as sin signals.

Figure 6:
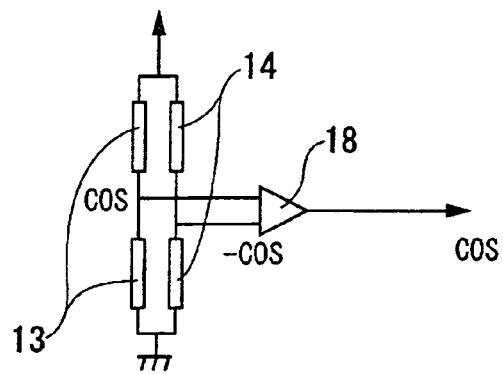
FIG. 6 is an explanatory diagram showing a third detection device unit and a fourth detection device unit configuring the detection unit.

FIG. 6 is an explanatory diagram showing the third detection device unit 13 and the fourth detection device unit 14.

As shown in FIG. 6, the third detection device unit 13 configured to obtain a cos signal and the fourth detection device unit 14 configured to obtain a −cos signal are connected to a second differential amplifier 18. Then, signals obtained by the third detection device unit 13 and the fourth detection device unit 14 are differentially amplified by the second differential amplifier 18 and output as cos signals.

Figure 7:
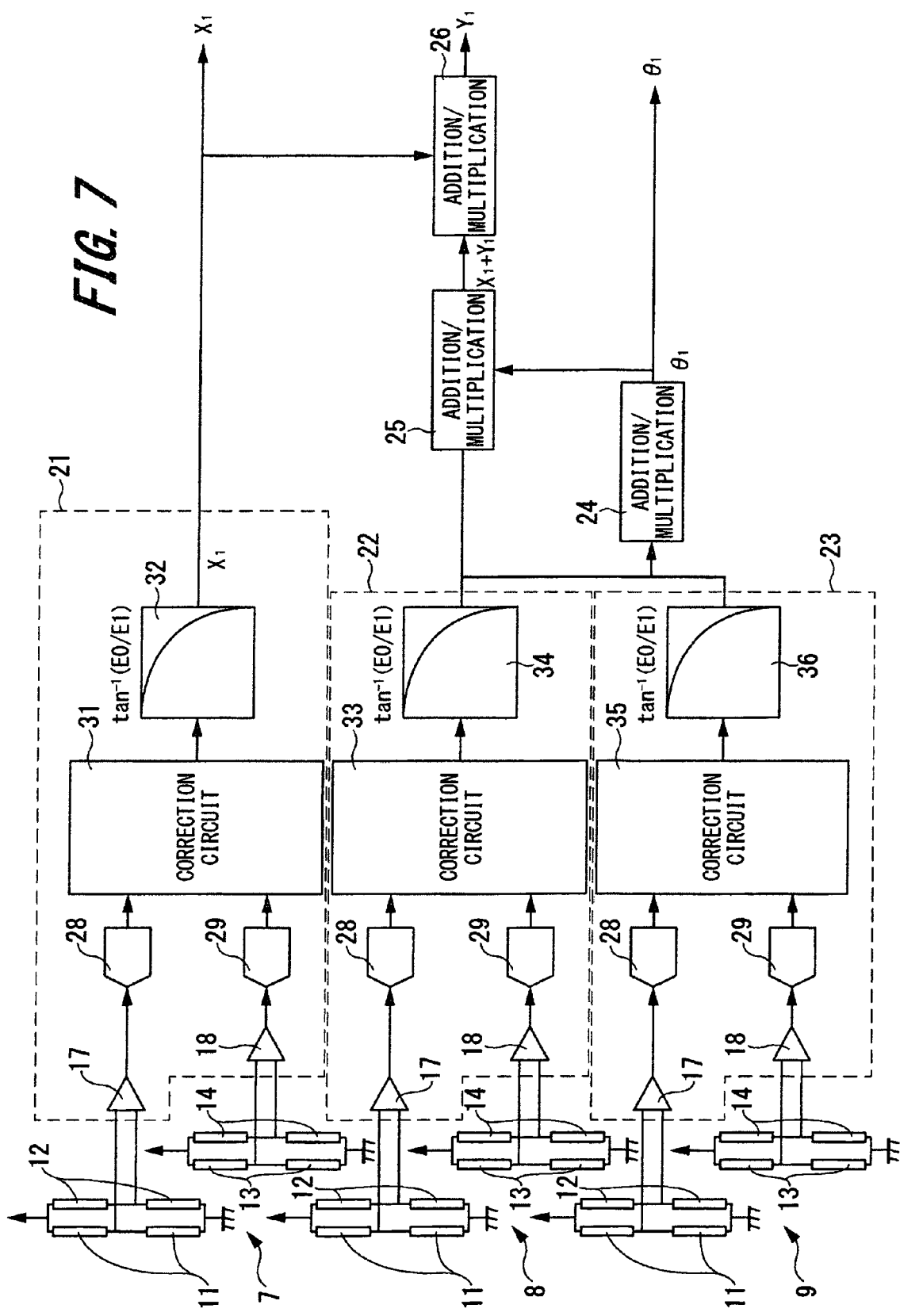
FIG. 7 is a block diagram showing an example of a detection algorithm of the displacement detection apparatus in the first embodiment example of the present invention.

FIG. 7 is a block diagram showing an example of a detection algorithm of the displacement detection apparatus 1 of the present example.

As shown in FIG. 7, for the detection algorithm, there are provided a first relative position information output unit 21, a second relative position information output unit 22, a third relative position information output unit 23, a first computing unit 24, a second computing unit 25, and a third computing unit 26.

The first relative position information output unit 21 is connected to the first detection unit 7 and the second relative position information output unit 22 is connected to the second detection unit 8. The third relative position information output unit 23 is connected to the third detection unit 9.

The first relative position information output unit 21 has the two differential amplifiers 17 and 18, two A/D converters 28 and 29, a first correction circuit 31, and a first position information calculation unit 32. As described above, the first differential amplifier 17 is connected to the first detection device unit 11 and to the second detection device unit 12 and the second differential amplifier 18 is connected to the third detection device unit 13 and to the fourth detection device unit 14.

The first differential amplifier 17 is connected to the first correction circuit 31 via the first A/D converter 28 and the second differential amplifier 18 is connected to the first correction circuit 31 via the second A/D converter 29. Then, signals differentially amplified by the first differential amplifier 17 and the second differential amplifier 18 are A/D converted by the first A/D converter 28 and the second A/D converter 29. The signal amplitude, offset, and phase of the A/D converted signals are corrected by the first correction circuit 31.

Then, the first correction circuit 31 is connected to the first position information calculation unit 32. The first position information calculation unit 32 calculates an amount of displacement $X_1$ in the first direction X in the detection head unit 3.

The second relative position information output unit 22 has the two differential amplifiers 17 and 18, the two A/D converters 28 and 29, a second correction circuit 33, and a second position information calculation unit 34. Similar to the first relative position information output unit 21 and the second relative position information output unit 22, the third relative position information output unit 23 has the two differential amplifiers 17 and 18, the two A/D converters 28 and 29, a third correction circuit 35, and a third position information calculation unit 36.

To the second position information calculation unit 34 and to the third position information calculation unit 36, the first computing unit 24 and the second computing unit 25 are connected. The second computing unit 25 is connected to the third computing unit 26. The third computing unit 26 is connected to the first position information calculation unit 32.

The first computing unit 24 computes an amount of rotational displacement $\theta_1$ of the detection head unit 3 based on the position information calculated by the second position information calculation unit 34 and the third position information calculation unit 36. The second computing unit 25 computes amounts of displacement in the first direction X and in the second direction Y of the detection head unit 3 based on the amount of rotational displacement $\theta_1$ computed by the first computing unit 24 and the position information calculated by the second position information calculation unit 34 and the third position information calculation unit 36. Further, the third computing unit 26 calculates an amount of displacement $Y_1$ in the second direction Y of the detection head unit 3 based on the position information of the detection head unit 3 computed by the second computing unit 25 and the first position information of the detection head unit 3 calculated by the first position information calculation unit 32.

Detailed methods for detecting the amounts of displacement $X_1$ and $Y_1$ in the first direction X and in the second direction Y of the detection head unit 3 and the amount of rotational displacement $\theta_1$ in the displacement detection apparatus 1 of the present example will be described later.

1-2. Operation of Displacement Detection Apparatus

Next, with reference to FIG. 1 to FIG. 8, the operation of the displacement detection apparatus 1 of the present example is explained.

As shown in FIG. 2, the first detection unit 7 obtains the signal $x_1$ in the first pitch direction $X_A$ of the reference track unit 4. The first pitch direction $X_A$ is parallel to the first direction X, which is the movement direction of the detection head unit 3. Hence, the displacement detection apparatus 1 calculates the position information (amount of displacement) $X_1$ in the first direction X in the detection head unit 3 by the first relative position information output unit 21 shown in FIG. 7 based on the detected signal $x_1$.

The signal $x_2$ obtained by the second detection unit 8 and the signal $x_3$ obtained by the third detection unit 9 have components in the first direction X and in the second direction Y. In the case where the detection head unit 3 moves in the second direction Y, the amount of change in phase of the signal $x_2$ of the second detection unit 8 and that of the signal $x_3$ of the third detection unit 9 are the same ($x_2=x_3$). The third computing unit 26 shown in FIG. 7 subtracts the signal $x_1$ having the component in the first direction X from the signal $x_2$ or the signal $x_3$. Thereby, the displacement detection apparatus 1 calculates the amount of displacement $Y_1$ in the second direction Y in the detection head unit 3.

Figure 8:
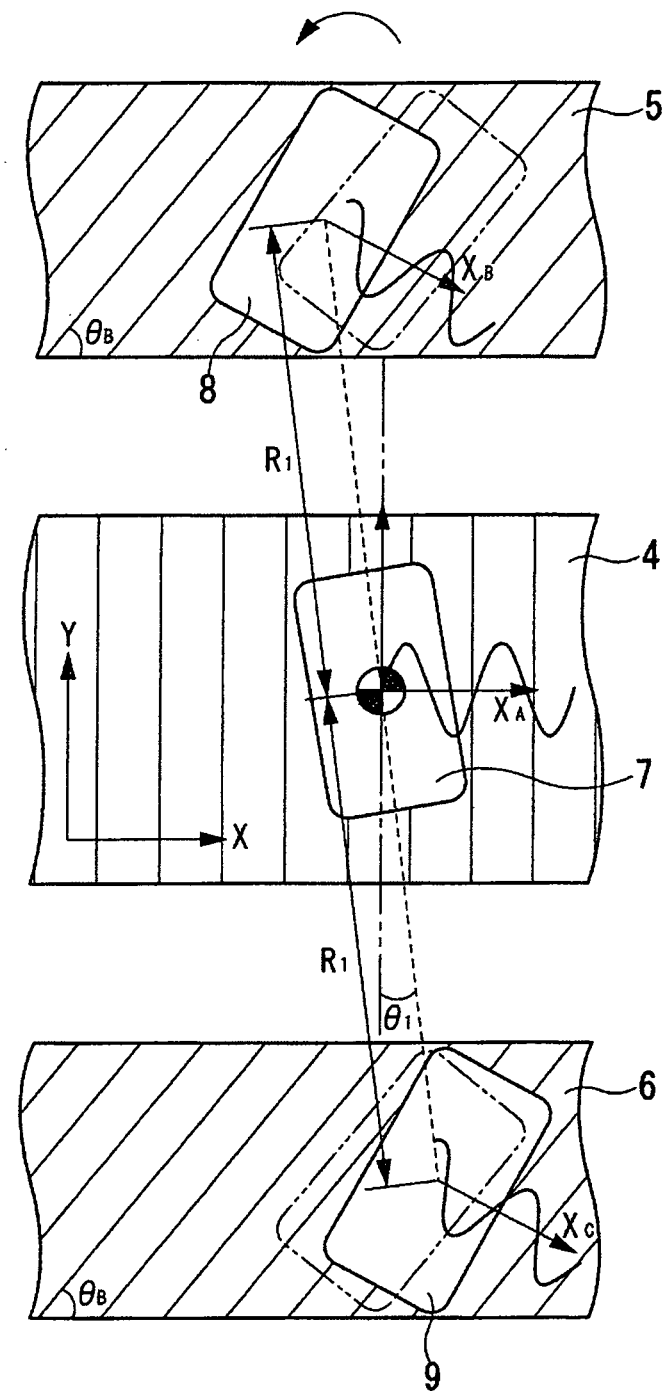
FIG. 8 is an explanatory diagram showing a state where a detection head unit of the displacement detection apparatus in the first embodiment example of the present invention rotates around a normal of a plane parallel to the plane along which the detection head unit moves.

Next, with reference to FIG. 8, detection of the case where the detection head unit 3 rotates around a normal of a plane parallel to the plane along which the detection head unit 3 moves, with the first detection unit 7 as a center, that is, detection of so-called azimuth deviation is explained.

FIG. 8 is an explanatory diagram showing a state where the detection head unit 3 rotates with an axis Q as a center.

As shown in FIG. 8, when the detection head unit 3 rotates counterclockwise by an angle $\theta_1$ with the axis Q as a center, the second detection unit 8 and the third detection unit 9 move in directions opposite to each other in a plane parallel to the plane along which the detection head unit 3 moves. Further, the second detection unit 8 and the third detection unit 9 are set equidistant from the first detection unit 7. Hence, the direction of the change in phase of the signal $x_2$ obtained by the second detection unit 8 is opposite to that of the signal $x_3$ obtained by the third detection unit 9 ($x_2=-x_3$). Hence, the deviation between the signal $x_2$ of the second detection unit 8 and the signal $x_3$ of the third detection unit 9 corresponds to the amount of rotational displacement $\theta_1$ of the detection head unit 3.

As described above, when the detection head unit 3 moves in the second direction Y, the amount of the change in phase of the signal $x_2$ of the second detection unit 8 is equal to that of the signal $x_3$ of the third detection unit 9. Hence, by comparing the amount of the change in phase of the signal $x_2$ of the second detection unit 8 with that of the signal $x_3$ of the third detection unit 9, it is possible to distinguish the displacement in the second direction Y from the rotational displacement in the detection head unit 3.

The displacement detection apparatus 1 performs subtraction between the signal $x_2$ of the second detection unit 8 and the signal $x_3$ of the third detection unit 9 by the first computing unit 24, thereby calculating the deviation between the two signals, that is, the amount of rotational displacement $\theta_1$ of the detection head unit 3.

Next, the second computing unit 25 corrects the position information calculated by the second position information calculation unit 34 and the third position information calculation unit 36 based on the calculated amount of rotational displacement $\theta_1$. Then, the third computing unit 26 subtracts the position information $X_1$ in the first direction X from the corrected position information. Thereby, the amount of rotational displacement $\theta_1$ and the amount of displacement $Y_1$ in the second direction Y in the detection head unit 3 are calculated.

Then, for example, the amount of rotational displacement $\theta_1$ is calculated by Equation 1 below and the amount of displacement $Y_1$ in the second direction Y is calculated by Equation 2 below using the calculated amount of rotational displacement $\theta_1$ as a correction value.

[Equation 1]

$$\theta_1 = -\theta_B + \cos^{-1}\left(\cos\theta_B - \frac{x_2 - x_3}{2R_1}\right) \quad (1)$$

[Equation 2]

$$Y_1 = \frac{x_2 - x_1\sin\theta_B - R_1(\cos\theta_B - \cos(\theta_B + \theta_1))}{\cos\theta_B} \quad (2)$$

In the present example, the example is explained, in which the calculated amount of rotational displacement $\theta_1$ is used for correction of the amount of displacement $Y_1$ in the second direction Y, but, this is not limited and the calculated amount of rotational displacement $\theta_1$ may be applied to correction of the amount of displacement $X_1$ in the first direction X. Further, it may also be possible to perform the arithmetic processing performed in the first computing unit 24, the second computing unit 25, and the third computing unit 26 in one computing unit. Furthermore, it may also be possible to perform the arithmetic operation by using a CPU (Central Processing Unit) or DSP (Digital Signal Processor).

As described above, according to the displacement detection apparatus 1 of the present example, it is possible to detect the amounts of displacement in two directions, that is, in the first direction X and in the second direction Y of the detection head unit 3 by the first detection unit 7 disposed in opposition to the reference track unit 4 and the two detection units 8 and 9 arranged in opposition to the sub-track units 5 and 6. Further, it is also possible to detect the amount of rotational displacement $\theta_1$ of the detection head unit 3 from the signals of the second detection unit 8 and the third detection unit 9.

Then, by using the amount of rotational displacement $\theta_1$ as a correction value of the amount of displacement in the first direction X and in the second direction Y, it is possible to detect a more accurate amount of displacement of the detection head unit 3.

[Another Example of Detection Algorithm]

Figure 9:
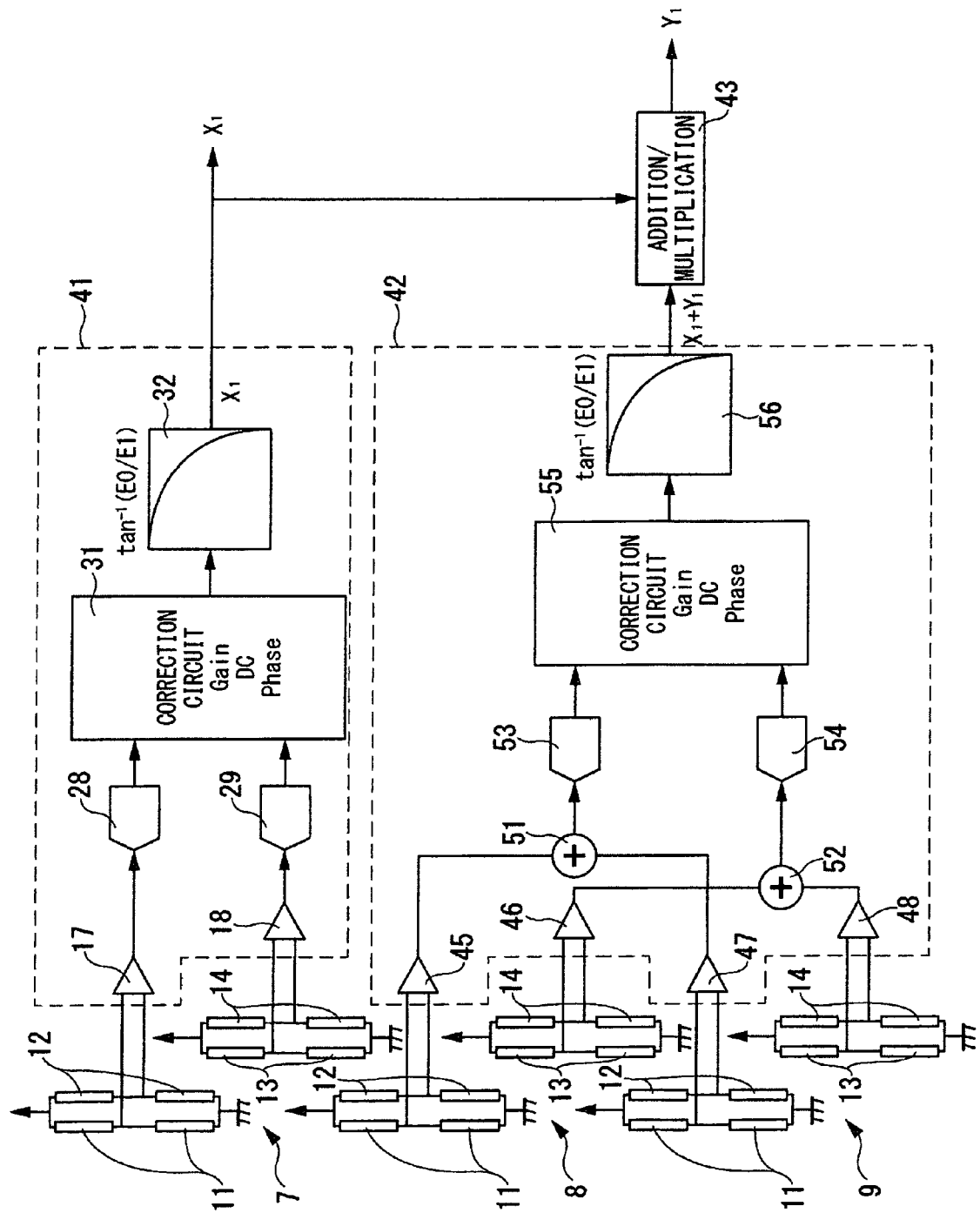
FIG. 9 is a block diagram showing another example of the detection algorithm of the displacement detection apparatus in the first embodiment example of the present invention.

FIG. 9 is a block diagram showing another example of the detection algorithm in the displacement detection apparatus 1 of the present example.

As shown in FIG. 9, for this detection algorithm, there are provided a first relative position information output unit 41, a second relative position information output unit 42, and a first computing unit 43. The first relative position information output unit 41 is the same as the first relative position information output unit 21 shown in FIG. 7, and therefore, its explanation is omitted.

The second relative position information output unit 42 has four differential amplifiers 45, 46, 47, and 48, two adders 51 and 52, two A/D converters 53 and 54, a second correction circuit 55, and a second position information calculation unit 56.

The first differential amplifier 45 is connected to the first detection device unit 11 and the second detection device unit 12 of the second detection unit 8 and the second differential amplifier 46 is connected to the third detection device unit 13 and the fourth detection device unit 14 of the second detection unit 8. The third differential amplifier 47 is connected to the first detection device unit 11 and the second detection device unit 12 of the third detection unit 9 and the fourth differential amplifier 48 is connected to the third detection device unit 13 and the fourth detection device unit 14 of the third detection unit 9.

The first differential amplifier 45 and the third differential amplifier 47 are connected to the first adder 51 and the second differential amplifier 46 and the fourth differential amplifier 48 are connected to the second adder 52. The first adder 51 adds the sin signals obtained by the second detection unit 8 and the third detection unit 9. The second adder 52 adds the cos signals obtained by the second detection unit 8 and the third detection unit 9. That is, by the first adder 51 and the second adder 52, the signal $x_2$ of the second detection unit 8 and the signal $x_3$ of the third detection unit 9 are added.

Here, as described above, when the detection head unit 3 rotates with the axis Q as a center, the direction of the change in phase of the signal $x_2$ of the second detection unit 8 is opposite to that of the signal $x_3$ of the third detection unit 9 ($x_2 = -x_3$). Hence, by adding the signal $x_2$ of the second detection unit 8 and the signal $x_3$ of the third detection unit 9, it is possible to cancel in advance the deviation in the second direction Y caused by the rotation of the detection head unit 3.

The first adder 51 is connected to the second correction circuit 55 via the first A/D converter 53 and the second adder 52 is connected to the second correction circuit 55 via the second A/D converter 54. The second correction circuit 55 is connected to the second position information calculation unit 56. The second position information calculation unit 56 calculates position information $X_1 + Y_1$ of the detection head unit 3 based on the signal output from the second correction circuit 55.

Further, the second position information calculation unit 56 is connected to the first computing unit 43. The first computing unit 43 subtracts the position information $X_1$ calculated by the first position information calculation unit 32 from the position information $X_1 + Y_1$ calculated by the second position information calculation unit 56. Thereby, the amount of displacement $Y_1$ in the second direction Y whose amount of rotational displacement $\theta_1$ of the detection head unit 3, that is, so-called azimuth deviation is corrected in advance, is calculated.

In the algorithm shown in FIG. 9, the amount of displacement $Y_1$ in the second direction Y is calculated as in Equation 3 below using the signal $x_1$ of the first detection unit 7, the signal $x_2$ of the second detection unit 8, and the signal $x_3$ of the third detection unit 9, and the inclination angle $\theta_B$ in the second and third pitch directions $X_B$ and $X_C$.

[Equation 3]

$$Y_1 = \frac{\frac{x_2 + x_3}{2} - x_1 \sin\theta_B}{\cos\theta_B} \quad (3)$$

As described above, by the detection algorithm shown in FIG. 9, it is also possible to accurately detect the amount of displacement $X_1$ in the first direction X and the amount of displacement $Y_1$ in the second direction Y of the detection head unit 3 similar to the detection algorithm shown in FIG. 7.

As in a displacement detection apparatus according to another embodiment example, to be described next, it is possible to appropriately set the positions where the first detection unit 7, the second detection unit 8, and the third detection unit 9 are disposed or the number of the reference track units 4 and the sub-track units 5 and 6 of the scale unit 102 or the positions thereof. Hence, the circuit configuration of the displacement detection apparatus is not limited to that shown in FIG. 7 and FIG. 8 and it is set appropriately in accordance with the state of the detection head unit 3 and the scale unit 2.

1-3 Modification of Detection Unit

Next, a modification of the detection unit is explained with reference to FIG. 10.

Figure 10:
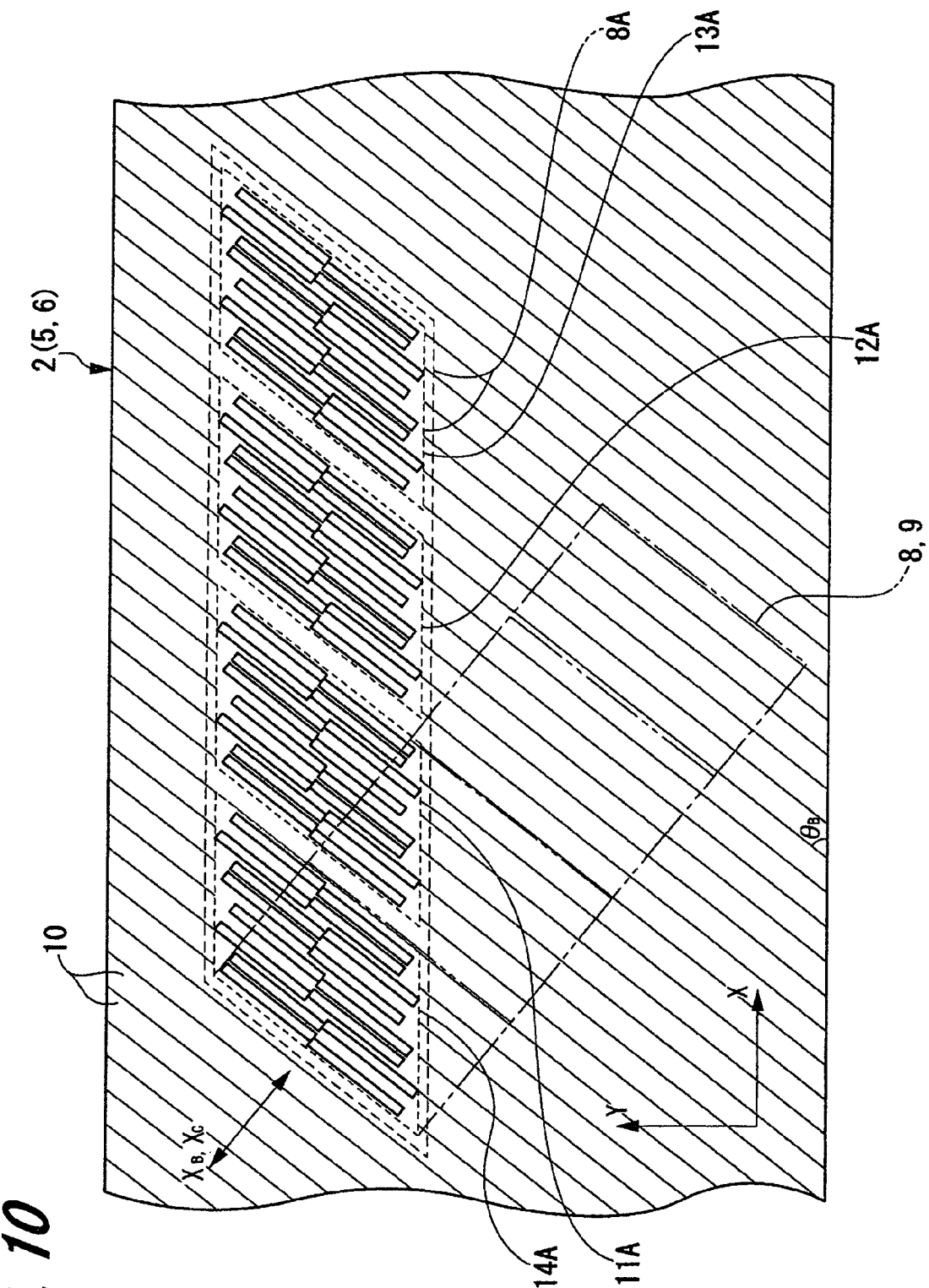
FIG. 10 is an explanatory diagram showing a modification of the detection unit of the displacement detection apparatus in the first embodiment example of the present invention.

FIG. 10 is an outline configuration diagram showing a detection unit.

A detection unit 8A shown in FIG. 10 is disposed, for example, for track units whose pitch directions $X_B$ and $X_C$ are inclined with respect to the first direction X as the first sub-track unit 5 and the second sub-track unit 6.

As shown in FIG. 10, the detection unit 8A is formed into substantially the parallelogram shape. One pair of opposite sides of the two pairs of opposite sides of the detection unit 8A is arranged along the first direction X and the other pair of opposite sides is inclined at the predetermined angle $\theta_B$ with respect to the second direction Y and is orthogonal to the pitch directions $X_B$ and $X_C$ of the sub-track units 5 and 6.

Similar to the above-described detection units 7, 8, and 9, the detection unit 8A has a first detection device unit 11A, a second detection device unit 12A, a third detection device unit 13A, and a fourth detection device unit 14A configured by MR devices. The first detection device unit 11A, the second detection device unit 12A, the third detection device unit 13A, and the fourth detection device unit 14A are arranged side by side along the first direction X, which is the longitudinal direction of the scale unit 2.

According to the detection unit 8A of the modification shown in FIG. 10, it is possible to set the length in the second direction Y smaller than that of the detection units 8 and 9 in the rectangular shape shown by the alternate long and short dash line. Hence, it is made possible to reduce also the length in the second direction Y of the sub-track units 5 and 6 for which the detection unit 8A is disposed.

2. Second Embodiment Example

Next, a displacement detection apparatus according to a second embodiment example is explained with reference to FIG. 11.

Figure 11:
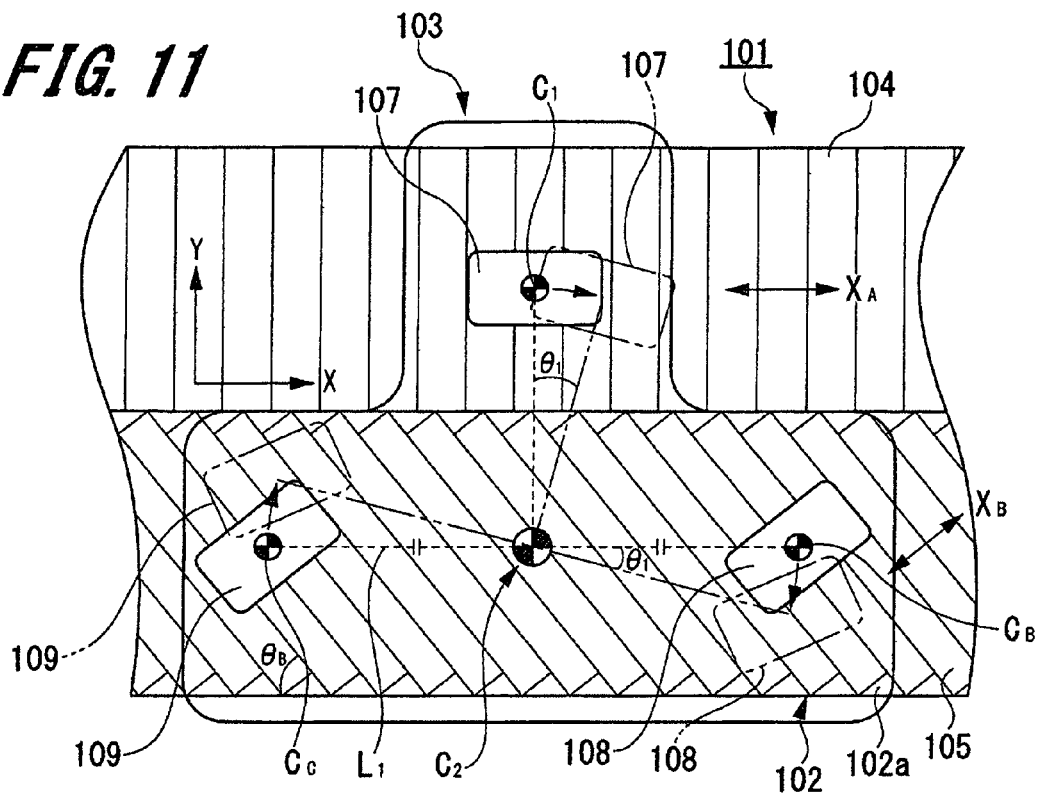
FIG. 11 is an outline configuration diagram showing a displacement detection apparatus in a second embodiment example of the present invention.

FIG. 11 is an outline configuration diagram showing a displacement detection apparatus according to the second embodiment example.

In a displacement detection apparatus 101 according to the second embodiment example, two detection units are disposed for a sub-track unit. Therefore, here, the same symbols are attached to the portions common to those of the displacement detection apparatus 1 according to the first embodiment example and duplicated explanation is omitted.

As shown in FIG. 11, the displacement detection apparatus 101 includes a scale unit 102 and a detection head unit 103 that moves relatively to the scale unit 102. The scale unit 102 has a reference track unit 104 and a sub-track unit 105. The second pitch direction $X_B$, which is the direction in which the repetition pitch in the sub-track unit 105 is the shortest, is inclined at the angle $\theta_B$ with respect to the first direction X in a plane parallel to a measurement plane 102a of the scale unit 102.

The reference track unit 104 has the same configuration as that of the reference track unit 4 of the displacement detection apparatus 1 according to the first embodiment example, and therefore, its explanation is omitted here.

The detection head unit 103 has a first detection unit 107, a second detection unit 108, and a third detection unit 109. The first detection unit 107 is disposed in opposition to the reference track unit 104. The configuration of the first detection unit 107 is the same as that of the first detection unit 7 of the displacement detection apparatus 1 according to the first embodiment example, and therefore, its explanation is omitted here.

The second detection unit 108 and the third detection unit 109 are disposed in opposition to the sub-track unit 105. The second detection unit 108 and the third detection unit 109 detect the amount of displacement only in the second pitch direction $X_B$ of the sub-track unit 105.

Further, the second detection unit 108 and the third detection unit 109 are disposed in positions in the same phase of the magnetic pattern 10, which is the scale of the sub-track unit 105. Hence, even if the detection head unit 103 moves in the first direction X or in the second direction Y, the phases of the signals $x_2$ and $x_3$ obtained by the second detection unit 108 and the third detection unit 109 remain the same with respect to each other. The second detection unit 108 and the third detection unit 109 are disposed substantially in the same positions in the second direction Y in the sub-track unit 105.

The center of a line $L_1$ connecting a center $C_B$ of the second detection unit 108 and a center $C_C$ of the third detection unit 109 is defined as a virtual center $C_2$. The line $L_1$ is set substantially parallel to the first direction X. The first detection unit 107 is disposed so that its center $C_1$ is in a position on a line extending along the second direction Y from the virtual center $C_2$. That is, the first detection unit 107 is disposed substantially at the center between the second detection unit 108 and the third detection unit 109 in the first direction X. Further, the length from the center $C_1$ of the first detection unit 107 to the center $C_B$ of the second detection unit 108 is set substantially equal to the length from the center $C_1$ of the first detection unit 107 to the center $C_C$ of the third detection unit 109.

Next, the operation of the displacement detection apparatus 101 according to the second embodiment example is explained.

First, detection of the rotation of the detection head unit 103 along the plane of the scale unit 102, that is, detection of so-called azimuth deviation is explained. Here, the center of rotation of the detection head unit 103 is defined as the virtual center $C_2$.

As described above, the virtual center $C_2$ is located at the center between the second detection unit 108 and the third detection unit 109. Consequently, the second detection unit 108 and the third detection unit 109 move in directions opposite to each other in a plane parallel to the plane along which the detection head unit 103 moves. Hence, the direction of the change in phase of the signal obtained by the second detection unit 108 is opposite to that of the signal obtained by the third detection unit 109. Thereby, by calculating the deviation between the signal of the second detection unit 108 and the signal of the third detection unit 109, it is possible to find the amount of rotational displacement $\theta_1$ of the detection heat unit 103.

The first detection unit 107 is rotated by the angle $\theta_1$ with the virtual center $C_2$ as a center. Then, based on the calculated amount of rotational displacement $\theta_1$, the signal obtained by the first detection unit 107 is corrected. Hence, it is possible to correct the deviation of the amount of displacement in the first direction X caused by the rotation, and therefore, it is possible to find a more accurate amount of displacement in the first direction X in the detection head unit 103.

Further, the signals obtained by the second detection unit 108 and the third detection unit 109 are corrected based on the calculated amount of rotational displacement $\theta_1$. Thereby, it is possible to find a more accurate amount of displacement in the second direction Y in the detection head unit 103.

Similar to the detection algorithm shown in FIG. 9, by adding the signal of the second detection unit 108 and the signal of the third detection unit 109, it is possible to cancel in advance the deviation in the second direction Y caused by the rotation of the detection head unit 103.

Further, in the case where there is no deviation between the signals of the second detection unit 108 and the third detection unit 109, it is possible to determine that the detection head unit 103 is not rotated. In this case, the amount of displacement in the first direction X is found from the signal of the first detection unit 107 as in the displacement detection apparatus 1 according to the first embodiment example.

Other configurations are the same as those of the displacement detection apparatus 1 according to the first embodiment, and therefore, their explanation is omitted. By the displacement detection apparatus 101 having such a configuration, it is also possible to obtain the same working and effect as those of the displacement detection apparatus 1 according to the first embodiment example described above.

For the displacement detection apparatus 101 according to the second embodiment example described above, the example is explained in which the first detection unit 107 is disposed so that its center $C_1$ is in a position on a line extending along the second direction Y from the virtual center $C_2$, but, the example is not limited to this. The first detection unit 107 may not be disposed on the line extending along the second direction Y from the virtual center $C_2$. That is, the length from the center $C_1$ of the first detection unit 107 to the center $C_B$ of the second detection unit 108 may be set different from the length from the center $C_1$ of the first detection unit 107 to the center $C_C$ of the third detection unit 109.

3. Third Embodiment Example

Next, a displacement detection apparatus according to a third embodiment example is explained with reference to FIG. 12.

Figure 12:
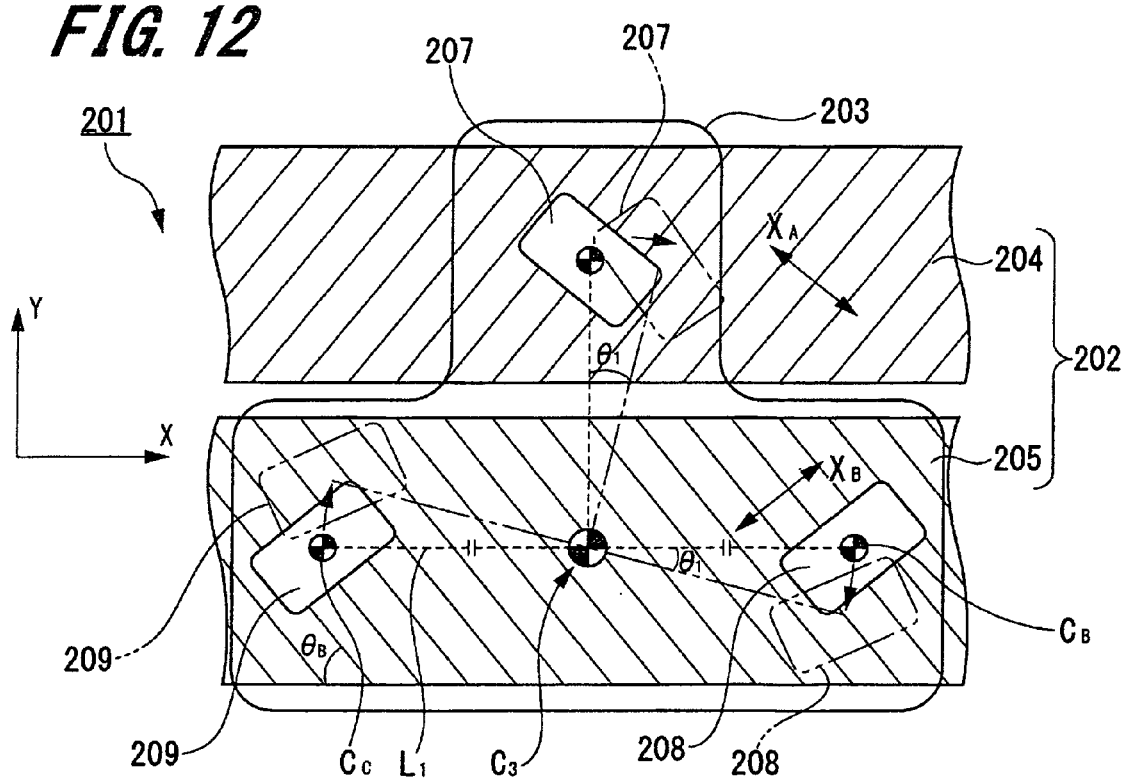
FIG. 12 is an outline configuration diagram showing a displacement detection apparatus in a third embodiment example of the present invention.

FIG. 12 is an outline configuration diagram showing a displacement detection apparatus according to the third embodiment example.

In a displacement detection apparatus 201 according to the third embodiment example, two track units are provided on a scale unit and each pitch direction of the two track units is set inclined with respect to the first direction X. Hence, here, the same symbols are attached to the portions common to the displacement detection apparatus according to the first embodiment example and the displacement detection apparatus 101 according to the second embodiment example and duplicated explanation is omitted.

As shown in FIG. 12, the displacement detection apparatus 201 according to the third embodiment example has a scale unit 202 and a detection head unit 203. The scale unit 202 is provided with a first track unit 204 and a second track unit 205.

The first pitch direction $X_A$ of the first track unit 204 and the second pitch direction $X_B$ of the second track unit 205 are inclined at a predetermined angle with respect to the first direction X of the scale unit 202. Further, the first pitch direction $X_A$ and the second pitch direction $X_B$ are line-symmetric with respect to a boundary line between the first track unit 204 and the second track unit 205.

Then, in the displacement detection apparatus 201 according to the third embodiment example, one of the two track units 204 and 205 is defined as a reference track unit and the other is defined as a sub-track unit.

For the displacement detection apparatus 201 according to the third embodiment example, the example is explained in which the first pitch direction $X_A$ and the second pitch direction $X_B$ are line-symmetric, but, the example is not limited to this. For example, the first pitch direction $X_A$ and the second pitch direction $X_B$ may not be line-symmetric.

The detection head unit 203 has a first detection unit 207, a second detection unit 208, and a third detection unit 209. The first detection unit 207 is disposed in opposition to the first track unit 204 and the second detection unit 208 and the third detection unit 209 are disposed in opposition to the second track unit 205.

Similar to the second detection unit 108 and the third detection unit 109 according to the second embodiment example, the second detection unit 208 and the third detection unit 209 are disposed in positions in the same phase. Further, the second detection unit 208 and the third detection unit 209 are disposed substantially in the same position in the second direction Y in the second track unit 205.

Here, the center of the line $L_1$ connecting the center $C_B$ of the second detection unit 208 and the center $C_C$ of the third detection unit 209 is defined as a virtual center $C_3$. The line $L_1$ is set substantially parallel to the first direction X. The first detection unit 207 is disposed so that its center $C_1$ is in a position on a line extending along the second direction from the virtual center $C_3$. That is, the first detection unit 207 is disposed substantially at the center between the second detection unit 208 and the third detection unit 209 in the first direction X. Further, the length from the center $C_1$ of the first detection unit 207 to the center $C_B$ of the second detection unit 208 is set substantially equal to the length from the center $C_1$ of the first detection unit 207 to the center $C_c$ of the third detection unit 209.

Next, the operation of the displacement detection apparatus 201 according to the third embodiment example is explained.

First, detection of the rotation of the detection head unit 203 along the plane of the scale unit 202, that is, detection of so-called azimuth deviation is explained. Here, the center of rotation of the detection head unit 203 is defined as the virtual center $C_3$.

Similar to the displacement detection apparatus 101 according to the second embodiment example, the amount of rotational displacement $\theta_1$ of the detection head unit 203 can be calculated from the deviation between the signals of the second detection unit 208 and the third detection unit 209 arranged over the same track unit 205.

Next, a method for calculating the amount of displacement $X_1$ in the first direction X and the amount of displacement $Y_1$ in the second direction Y when the detection head unit 203 rotates by the amount of rotational displacement $\theta_1$ is explained.

First, an amount of displacement $X_{1a}$ is calculated by correcting the amount of deviation caused by the rotation in the first detection unit 207 based on the calculated amount of rotational displacement $\theta_1$. It is possible to cancel the amount of deviation caused by the rotation by adding the amounts of displacement of the second detection unit 208 or the third detection unit 209 (($X_{1b}$=amount of displacement of the second detection unit 208+amount of displacement of the third detection unit 209)/2).

Then, it is possible to calculate the amount of displacement $X_1$ in the first direction X from Equation 4 below and the amount of displacement $Y_1$ in the second direction Y from Equation 5 below based on the corrected amount of displacement $X_{1a}$ of the first detection unit 207 and the calculated amount of displacement $X_{1b}$ of the second detection unit 208 or the third detection unit 209.

[Equation 4]

$$X_1 = (X_{1a} + X_{1b})\cos(\pi/2 - \theta_B)/2 \quad (4)$$

[Equation 5]

$$Y_1 = (X_{1a} + X_{1b})\sin(\pi/2 - \theta_B)/2 \quad (5)$$

Other configurations are the same as those of the displacement detection apparatus 1 according to the first embodiment and the displacement detection apparatus 101 according to the second embodiment example, and therefore, their explanation is omitted. By the displacement detection apparatus 201 having such a configuration, it is also possible to obtain the same working and effect as those of the displacement detection apparatus 1 according to the first embodiment example and the displacement detection apparatus 101 according to the second embodiment example described above.

4. Fourth Embodiment Example

Next, a fourth embodiment example of a displacement detection apparatus of the present invention is explained with reference to FIG. 13.

Figure 13:
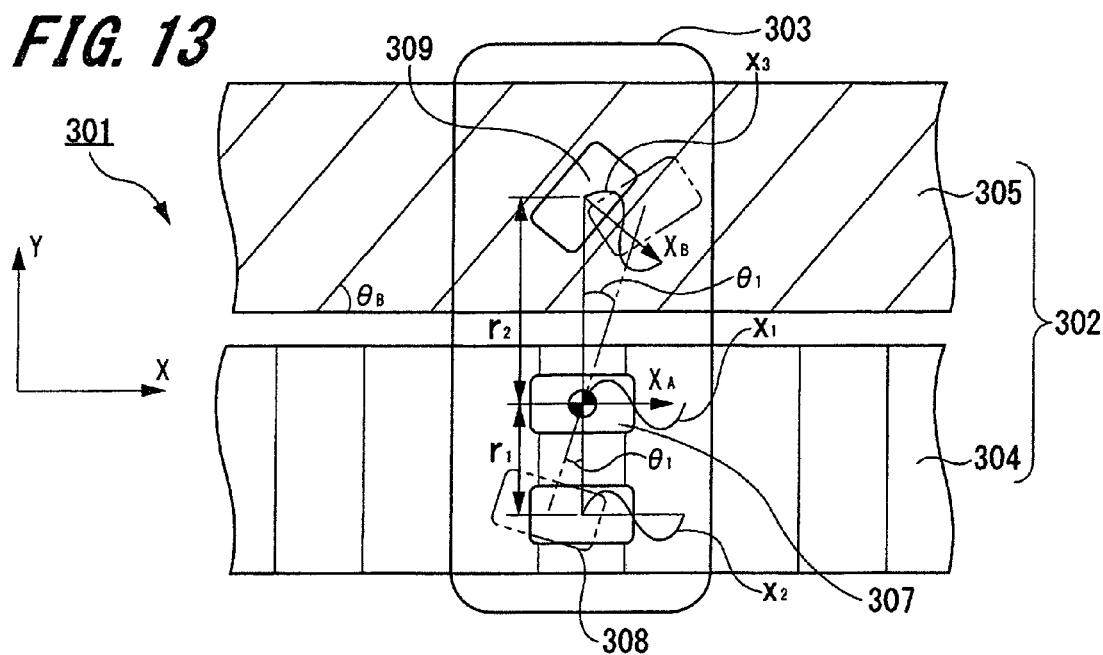
FIG. 13 is an outline configuration diagram showing a displacement detection apparatus in a fourth embodiment example of the present invention.

FIG. 13 is an outline configuration diagram showing a displacement detection apparatus according to the fourth embodiment example.

In a displacement detection apparatus 301 according to the fourth embodiment example, two detection units are provided for a reference track unit and one detection unit is provided for a sub-track unit. Hence, here, the same symbols are attached to the portions common to the displacement detection apparatus 1 according to the first embodiment example and the displacement detection apparatus 101 according to the second embodiment example and duplicated explanation is omitted.

As shown in FIG. 13, the displacement detection apparatus 301 according to the fourth embodiment example has a scale unit 302 and a detection head unit 303. The scale unit 302 is provided with a reference track unit 304 and a sub-track unit 305. The first pitch direction $X_A$ of the reference track unit 304 is set parallel to the first direction X. The second pitch direction $X_B$ of the sub-track unit 305 is inclined at the predetermined angle $\theta_B$ with respect to the first direction X.

The detection head unit 303 has a first detection unit 307, a second detection unit 308, and a third detection unit 309. The first detection unit 307 and the second detection unit 308 are disposed in opposition to the reference track unit 304, and the third detection unit 309 is disposed in opposition to the sub-track unit 305.

The first detection unit 307 and the second detection unit 308 are disposed in positions in the same phase in the first pitch direction $X_A$, that is, in the first direction X. Further, the first detection unit 307 is disposed on one side in the second direction Y in the reference track unit 304 and the second detection unit 308 is disposed on the other side in the second direction Y in the reference track unit 304. Hence, the distance from the first detection unit 307 to the third detection unit 309 is set different from the distance from the second detection unit 308 to the third detection unit 309.

Here, a case is explained, where the detection head unit 303 rotates in the plane along which the detection head unit 303 moves with the center of the first detection unit 307 as an axis. The distance from the center of the first detection unit 307 to the center of the second detection unit 308 is defined as $r_1$ and the distance from the center of the first detection unit 307 to the center of the third detection unit 309 is defined as $r_2$.

The second detection unit 308 rotates by the angle $\theta_1$ with a radius of rotation $r_1$ and with the first detection unit 307 as a center. Hence, a deviation occurs between the signal $x_1$ of the first detection unit 307 and the signal $x_2$ of the second detection unit 308. Then, based on the deviation between the two signals and the length $r_1$ from the first detection unit 307 to the second detection unit 308, the amount of rotational displacement $\theta_1$ of the detection head unit 303 is calculated. The amount of rotational displacement $\theta_1$ is calculated from, for example, Equation 6 below.

[Equation 6]

$$\theta_1 = \sin^{-1}\frac{x_2 - x_1}{r_1} \quad (6)$$

By correcting the signal $x_3$ obtained by the third detection unit 309 based on the calculated amount of rotational displacement $\theta_1$, it is possible to find the amount of displacement $Y_1$ in the second direction Y of the detection head unit 303. The amount of displacement $Y_1$ is calculated from, for example, Equation 7 below.

[Equation 7]

$$Y_1 = \frac{x_3 - r_2(\cos(\theta_B - \theta_1) - \cos\theta_B) - x_1\sin\theta_B}{\cos\theta_B} \quad (7)$$

Other configurations are the same as those of the displacement detection apparatus 1 according to the first embodiment and the displacement detection apparatus 101 according to the second embodiment example, and therefore, their explanation is omitted. By the displacement detection apparatus 301 having such a configuration, it is also possible to obtain the same working and effect of those of the displacement detection apparatus 1 according to the first embodiment example and the displacement detection apparatus 101 according to the second embodiment example.

5. Fifth Embodiment Example

Figure 14:
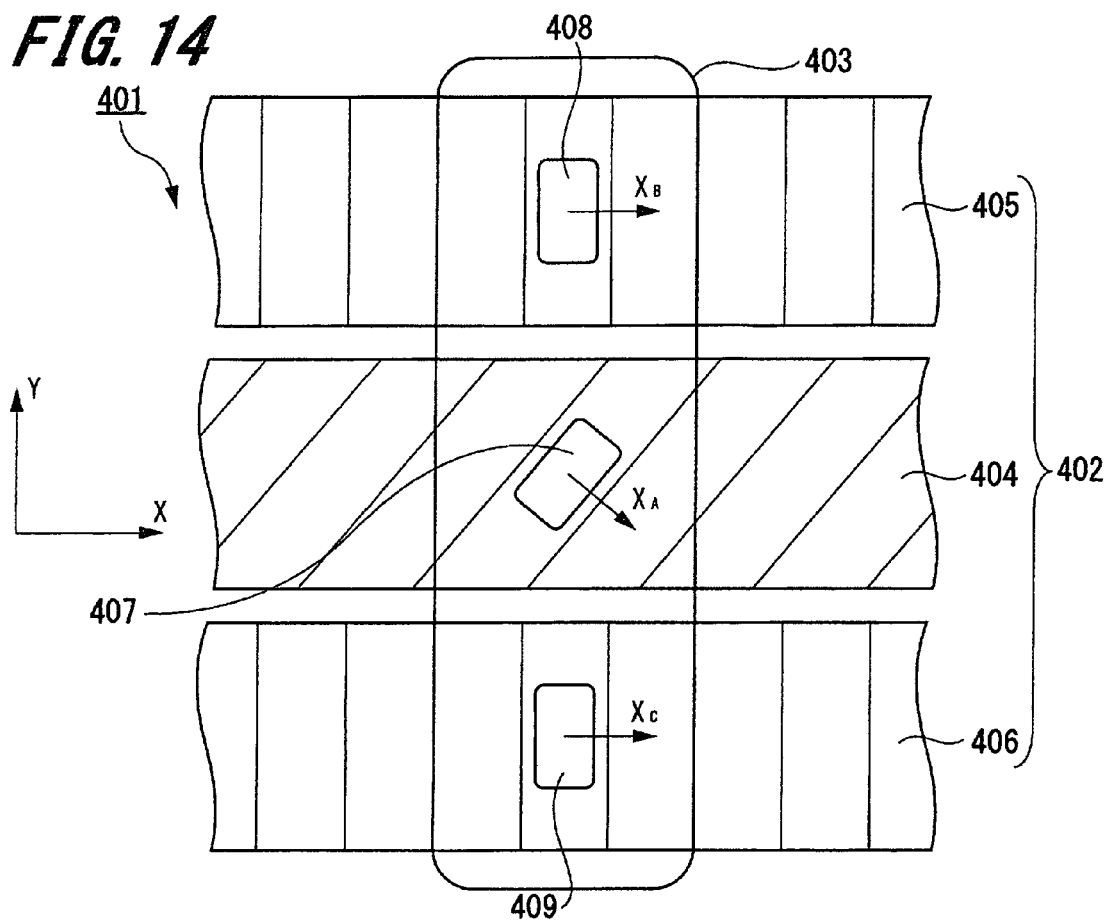
FIG. 14 is an outline configuration diagram showing a displacement detection apparatus in a fifth embodiment example of the present invention.
Figure 15:
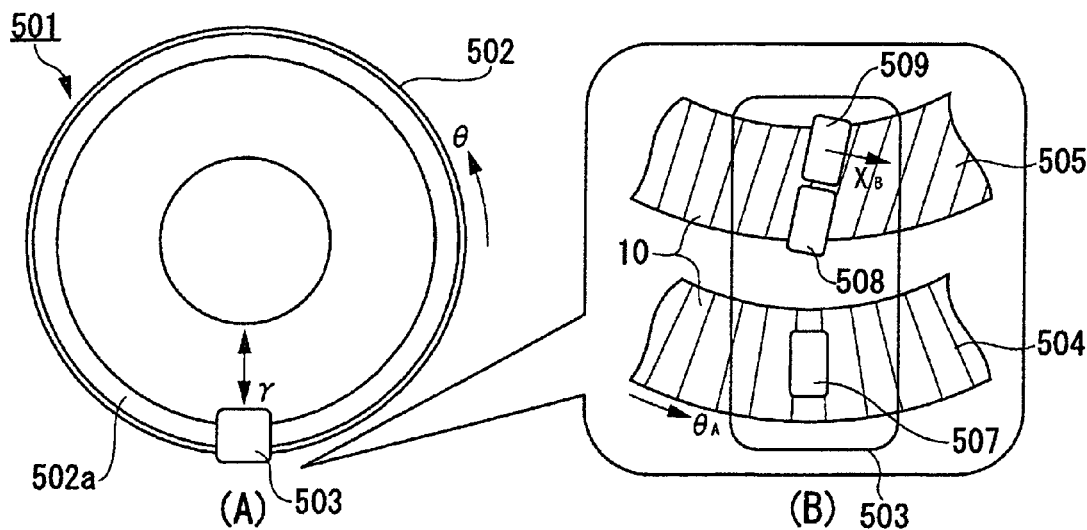
FIG. 15 is an outline configuration diagram showing a displacement detection apparatus in a sixth embodiment example of the present invention.
Figure 16:
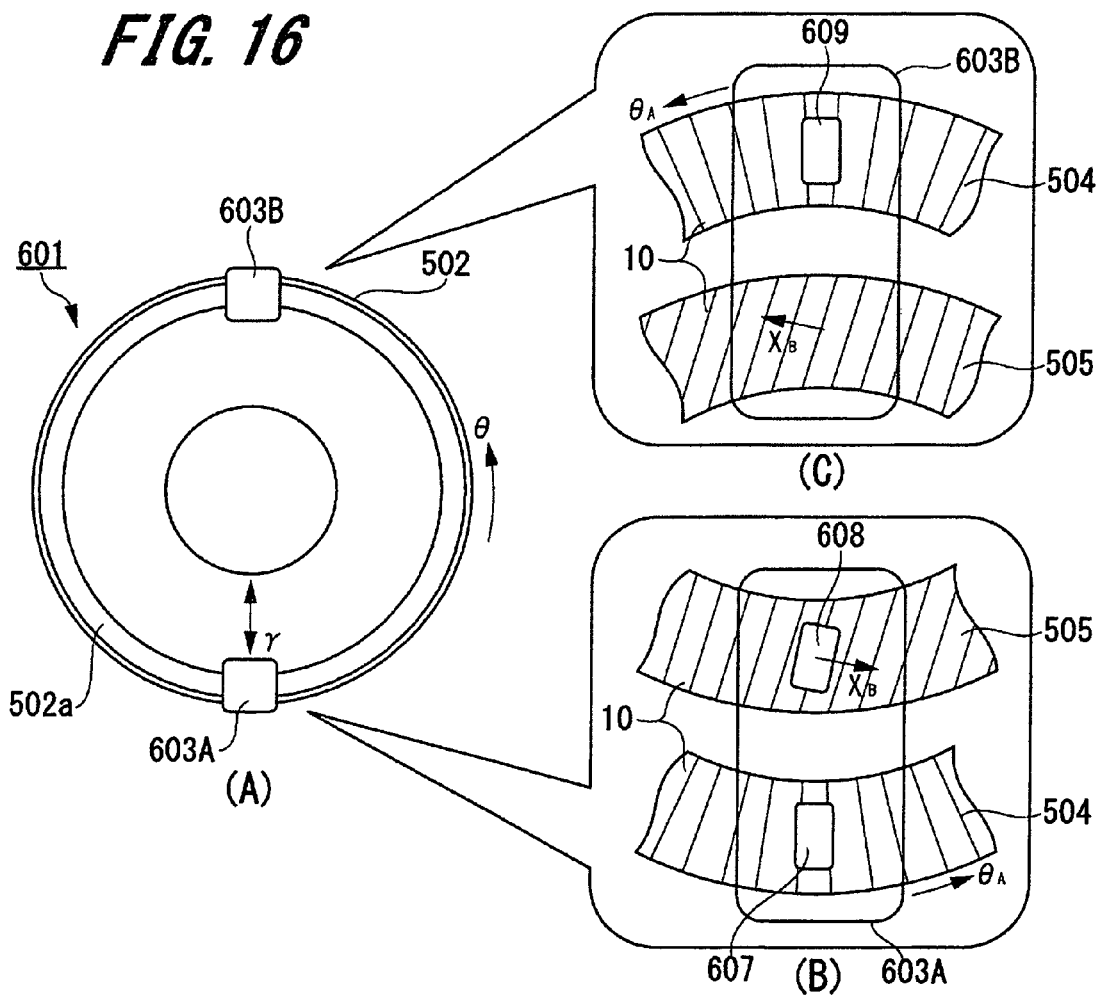
FIG. 16 is an outline configuration diagram showing a displacement detection apparatus in a seventh embodiment example of the present invention.
Figure 17:
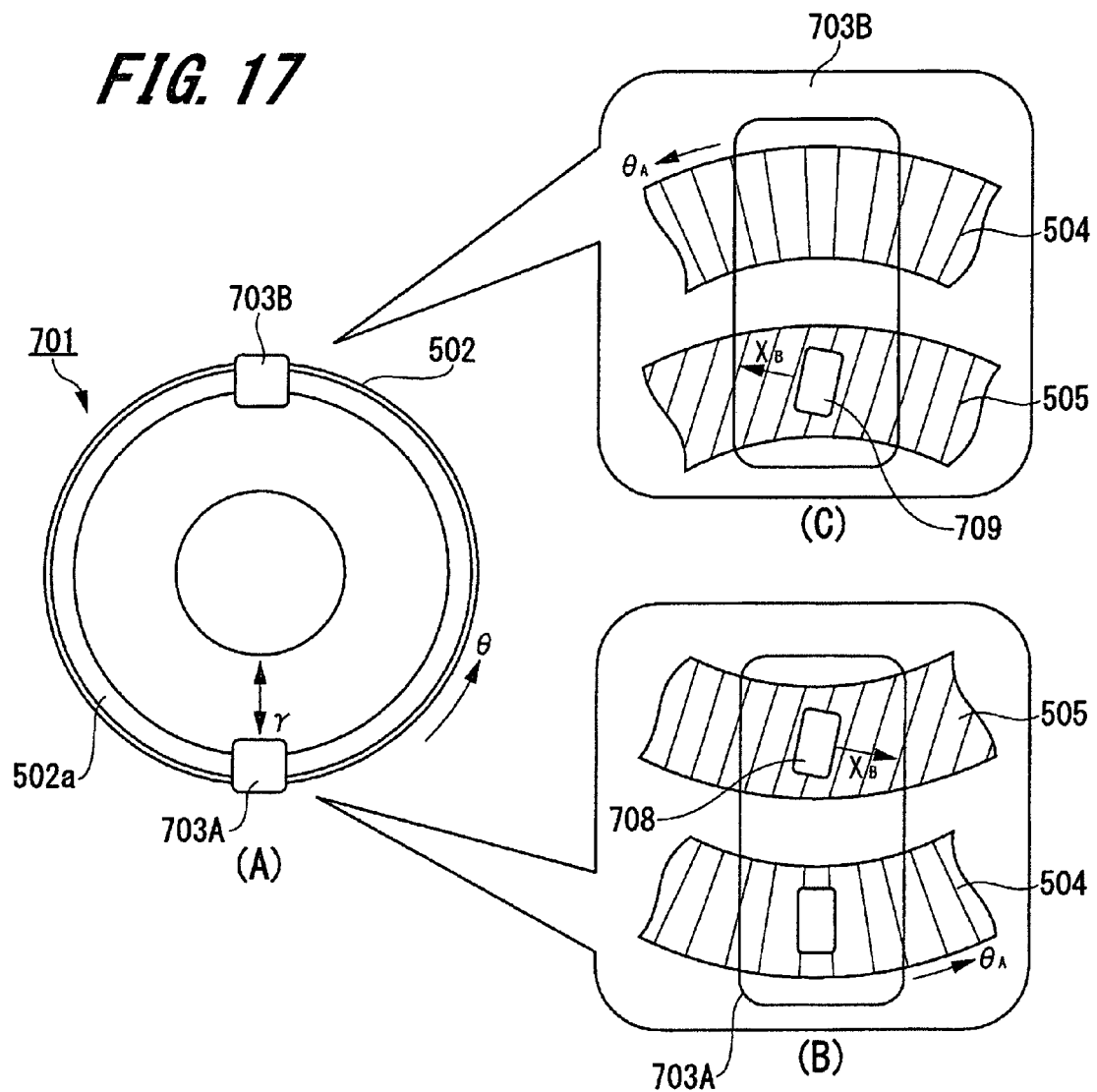
FIG. 17 is an outline configuration diagram showing a displacement detection apparatus in an eighth embodiment example of the present invention.

Next, with reference to FIG. 14, a fifth embodiment example of a displacement detection apparatus of the present invention is explained.

FIG. 14 is an outline configuration diagram showing a displacement detection apparatus according to the fifth embodiment example.

A displacement detection apparatus 401 according to the fifth embodiment example differs from the displacement detection apparatus 1 according to the first embodiment example in the pitch direction of a reference track unit and the pitch direction of a sub-track unit. Hence, here, the same symbols are attached to the portions common to the displacement detection apparatus 1 according to the first embodiment example and duplicated explanation is omitted.

As shown in FIG. 14, a scale unit 402 of the displacement detection apparatus 401 according to the fifth embodiment example has a reference track unit 404, a first sub-track unit 405, and a second sub-track unit 406. The reference track unit 404 is disposed between the first sub-track unit 405 and the second sub-track unit 406.

The first pitch direction $X_A$ of the reference track unit 404 is inclined at a predetermined angle with respect to the first direction X in the plane along which a detection head unit 403 moves. The second pitch direction $X_B$ of the first sub-track unit 405 and the third pitch direction $X_C$ of the second sub-track unit 406 are set substantially parallel to the first direction X.

The detection head unit 403 has a first detection unit 407, a second detection unit 408, and a third detection unit 409. The first detection unit 407 is disposed in opposition to the reference track unit 404. The second detection unit 408 is disposed in opposition to the first sub-track unit 405 and the third detection unit 409 is disposed in opposition to the second sub-track unit 406.

Then, the first detection unit 407 disposed for the reference track unit 404 detects the amount of displacement only in the first pitch direction $X_A$ inclined with respect to the first direction X. The second detection unit 408 and the third detection unit 409 disposed for the first sub-track unit 405 and the second sub-track unit 406 detect the amount of displacement only in the second pitch direction $X_B$ and in the third pitch direction $X_C$ parallel to the first direction X.

In the displacement detection apparatus 401 according to the fifth embodiment example, the amount of displacement in the first direction X is detected from the signal of the second detection unit 408 or the third detection unit 409. The amount of displacement in the second direction Y is calculated from the signal of the first detection unit 407 and the signal of the second detection unit 408 or the third detection unit 409. The amount of rotational displacement is calculated from the deviation between the signal of the second detection unit 408 and the signal of the third detection unit 409.

Other configurations are the same as those of the displacement detection apparatus 1 according to the first embodiment, and therefore, their explanation is omitted. By the displacement detection apparatus 401 having such a configuration, it is also possible to obtain the same working and effect as those of the displacement detection apparatus 1 according to the first embodiment example described above.

As described above, in the displacement detection apparatus of the present invention, the two detection units in opposition to the two track units whose pitch directions are different detect the displacement in the two orthogonal directions on a plane parallel to the plane along which the detection head unit moves. Further, the two detection units in opposition to the track units whose pitch directions are the same detect the amount of rotational displacement around an axis, which is a normal of a plane parallel to the plane along which the detection head unit moves.

6. Sixth Embodiment Example

Next, with reference to FIG. 15A and FIG. 15B, a displacement detection apparatus according to a sixth embodiment example is explained.

FIG. 15A is an outline configuration diagram showing a displacement detection apparatus according to the sixth embodiment example and FIG. 15B is an explanatory diagram in which essential parts are shown enlarged.

A displacement detection apparatus 501 according to the sixth embodiment example is a rotary encoder configured to detect angle information of a scale unit that rotates. As shown in FIG. 15A, the displacement detection apparatus 501 has a scale unit 502 in substantially a disc shape and a detection head unit 503 configured to detect angle information of the scale unit 502. The scale unit 502 is rotatably supported by a drive unit, not shown schematically. The detection head unit 503 is disposed in opposition to a measurement plane 502a of the scale unit 502.

As shown in FIG. 15B, the scale unit 502 is provided with a reference track unit 504 and a sub-track unit 505. Similar to the displacement detection apparatus 1 according to the first embodiment example, on the reference track unit 504 and the sub-track unit 505, the magnetic pattern 10 that serves as a scale is arranged.

The magnetic pattern 10 forming the reference track unit 504 is arranged radially along a radial direction r of the scale unit 502. A first pitch direction $\theta_A$ of the reference track unit 504 agrees with a circumferential direction $\theta$, which is the direction of rotation of the scale unit 502. The second pitch direction $X_B$ of the sub-track unit 505 is inclined at a predetermined angle with respect to the radial direction r and the circumferential direction $\theta$ of the scale unit 502 in the measurement plane 502a of the scale unit 502.

The detection head unit 503 has a first detection unit 507, a second detection unit 508, and a third detection unit 509. The first detection unit 507 is disposed in opposition to the reference track unit 504. The second detection unit 508 and the third detection unit 509 are disposed in opposition to the sub-track unit 505. Further, the second detection unit 508 and the third detection unit 509 are disposed in positions in the same phase in the second pitch direction $X_B$.

The first detection unit 507 detects the amount of displacement only in the first pitch direction $\theta_A$ of the reference track unit 504 and the second detection unit 508 and the third detection unit 509 detect the amount of displacement only in the second pitch direction $X_B$ of the sub-track unit 505.

In the displacement detection apparatus 501 according to the sixth embodiment example, the first detection unit 507 detects rotation angle information of the scale unit 502. Then, the first detection unit 507, and the second detection unit 508 or the third detection unit 509 detect the relative amount of displacement in the radial direction r in the scale unit 502 and the detection head unit 503.

Further, the second detection unit 508 and the third detection unit 509 detect the azimuth deviation of the detection head unit 503, that is, the amount of rotational displacement in a plane parallel to the measurement plane 502a of the scale unit 502. It may also be possible to correct the rotation angle information of the scale unit 502 and the relative amount of displacement in the radial direction r in the scale unit 502 and the detection head unit 503 by using the calculated amount of rotational displacement.

Other configurations are the same as those of the displacement detection apparatus 1 according to the first embodiment, and therefore, their explanation is omitted. By the displacement detection apparatus 501 having such a configuration, it is also possible to obtain the same working and effect as those of the displacement detection apparatus 1 according to the first embodiment example described above.

7. Seventh Embodiment Example

Next, with reference to FIG. 16A, FIG. 16B, and FIG. 16C, a displacement detection apparatus according to a seventh embodiment example is explained.

FIG. 16A is an outline configuration diagram showing a displacement detection apparatus according to the seventh embodiment example and FIG. 16B and FIG. 16C are explanatory diagrams in which essential parts are shown enlarged.

A displacement detection apparatus 601 according to the seventh embodiment example differs from the displacement detection apparatus 501 according to the sixth embodiment example in the configuration of a detection head unit. Hence, here, the detection head unit is explained and the same symbols are attached to the portions common to those of the displacement detection apparatus 501 according the sixth embodiment example and duplicated explanation is omitted.

As shown in FIG. 16A, the displacement detection apparatus 601 has the scale unit 502, a first detection head unit 603A, and a second detection head unit 603B. The first detection head unit 603A and the second detection head unit 603B are arranged at the same interval in the circumferential direction 8 of the scale unit 502.

As shown in FIG. 16B, the first detection head unit 603A has a first detection unit 607 and a second detection unit 608. The first detection unit 607 is disposed in opposition to the reference track unit 504 and the second detection unit 608 is disposed in opposition to the sub-track unit 505.

As shown in FIG. 16C, the second detection head unit 603B has a third detection unit 609. The third detection unit 609 is disposed in opposition to the reference track unit 504, which is the same track unit as that for the first detection unit 607. Then, the first detection unit 607 and the third detection unit 609 are disposed in positions in the same phase in the first pitch direction $\theta_A$ of the reference track unit 504.

The first detection unit 607 and the third detection unit 609 detect the amount of displacement only in the first pitch direction $\theta_A$ of the reference track unit 504 and the second detection unit 608 and the third detection unit 609 detect the amount of displacement only in the second pitch direction $X_B$ of the sub-track unit 505.

In the displacement detection apparatus 601 according to the seventh embodiment example, the first detection unit 607 or the third detection unit 609 detects rotation angle information of the scale unit 502. Then, the first detection unit 607 or the third detection unit 609, and the second detection unit 608 detect the relative amount of displacement in the radial direction r in the scale unit 502 and the detection head unit 503.

Other configurations are the same as those of the displacement detection apparatus 1 according to the first embodiment and the displacement detection apparatus 501 according to the sixth embodiment example, and therefore, their explanation is omitted. By the displacement detection apparatus 601 having such a configuration, it is also possible to obtain the same working and effect as those of the displacement detection apparatus 1 according to the first embodiment example and the displacement detection apparatus 501 according to the sixth embodiment example described above.

8. Eighth Embodiment Example

Next, with reference to FIG. 17A, FIG. 17B, and FIG. 17C, a displacement detection apparatus according to an eighth embodiment example is explained.

FIG. 17A is an outline configuration diagram showing a displacement detection apparatus according to the eighth embodiment example and FIG. 17B and FIG. 17C are explanatory diagrams in which essential parts are shown enlarged.

A displacement detection apparatus 701 according to the eighth embodiment example differs from the displacement detection apparatus 501 according to the sixth embodiment example in the configuration of a detection head unit. Hence, here, the detection head unit is explained and the same symbols are attached to the portions common to those of the displacement detection apparatus 501 according to the sixth embodiment example and duplicated explanation is omitted.

As shown in FIG. 17A, the displacement detection apparatus 701 has the scale unit 502, a first detection head unit 703A, and a second detection head unit 703B. Similar to the displacement detection apparatus 601 according to the seventh embodiment example, the first detection head unit 703A and the second detection head unit 703B are arranged at the same interval in the circumferential direction 6 of the scale unit 502.

As shown in FIG. 17B, the first detection head unit 703A has a first detection unit 707 and a second detection unit 708. The first detection unit 707 is disposed in opposition to the reference track unit 504 and the second detection unit 708 is disposed in opposition to the sub-track unit 505.

As shown in FIG. 17C, the second detection head unit 703B has a third detection unit 709. The third detection unit 709 is disposed in opposition to the sub-track unit 505, which is the same track unit as that for the second detection unit 708. Then, the second detection unit 708 and the third detection unit 709 are disposed in positions in the same phase in the second pitch direction $X_B$ of the sub-track unit 505.

Other configurations are the same as those of the displacement detection apparatus 1 according to the first embodiment and the displacement detection apparatus 501 according to the sixth embodiment example, and therefore, their explanation is omitted. By the displacement detection apparatus 701 having such a configuration, it is also possible to obtain the same working and effect as those of the displacement detection apparatus 1 according to the first embodiment example and the displacement detection apparatus 501 according to the sixth embodiment example.

9. Ninth Embodiment Example

Figure 18:
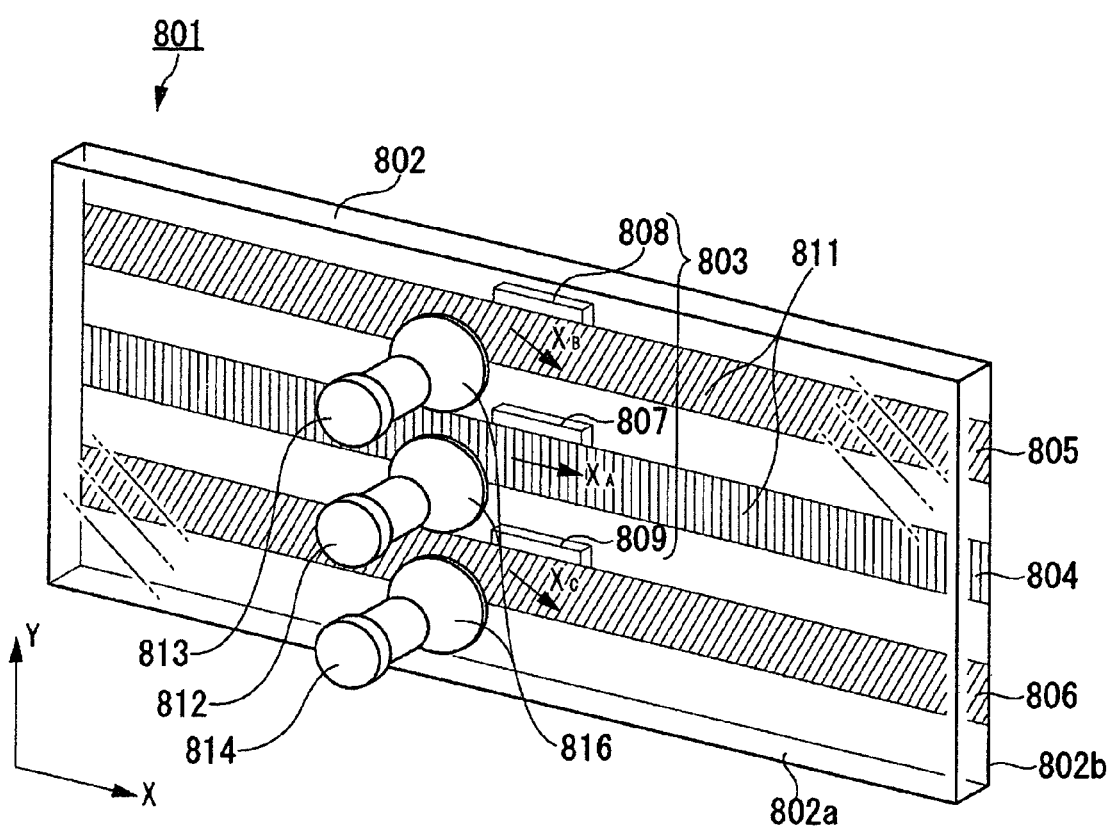
FIG. 18 is a perspective view showing a displacement detection apparatus in a ninth embodiment example of the present invention.

Next, with reference to FIG. 18, a displacement detection apparatus according to a ninth embodiment example is explained.

FIG. 18 is a perspective view showing a displacement detection apparatus according to the ninth embodiment example.

A displacement detection apparatus 801 according to the ninth embodiment example is a displacement detection apparatus configured to optically measure linear displacement in a plurality of directions by using a transmission grating. As shown in FIG. 18, the displacement detection apparatus 801 includes a scale unit 802, a detection head unit 803, and three light sources 812, 813, and 814.

The scale unit 802 is made of a member that transmits light, for example, glass and formed into substantially the rectangular flat-plate shape. The scale unit 802 and the detection head unit 803 move relatively along a measurement plane 802a of the scale unit 802.

In the displacement detection apparatus 801 according to the ninth embodiment example, the detection head unit 803 moves in the first direction X, which is the longitudinal direction of the scale unit 802, along the measurement plane 802a. The direction orthogonal to the first direction X in the plane along which the detection head unit 803 moves is defined as the second direction Y (the widthwise direction of the scale unit 802).

Similar to the scale unit 2 of the displacement detection apparatus 1 according to the first embodiment example, the scale unit 802 is provided with a reference track unit 804, a first sub-track unit 805, and a second sub-track unit 806. The three track units 804 to 806 are configured by a grating 811 that serves as a scale. The grating 811 is formed by providing a plurality of slits.

The first pitch direction $X_A$, which is the direction in which the repetition pitch of the slits forming the grating 811 in the reference track unit 804 is the shortest, is set substantially parallel to the first direction X. The second and third pitch directions $X_B$ and $X_C$, which are the directions in which the repetition pitches in the first sub-track unit 805 and the second sub-track unit 806 are the shortest, are set in the same direction. The second and third pitch directions $X_B$ and $X_C$ are inclined at a predetermined angle with respect to the first direction X and the second direction Y in the plane along which the detection head unit 803 moves and are set in directions different from the first pitch direction $X_A$.

The detection head unit 803 and the three light sources 812, 813, and 814 are disposed in such a manner as to sandwich the scale unit 802 in between. That is, the three light sources 812, 813, and 814 are disposed on the side of the measurement plane 802a side of the scale unit 802 and the detection head unit 803 is disposed on a backside 802b on the opposite side of the measurement plane 802a of the scale unit 802.

The detection head unit 803 has a first detection unit 807, a second detection unit 808, and a third detection unit 809. The first detection unit 807 is disposed in opposition to the reference track unit 804. The second detection unit 808 is disposed in opposition to the first sub-track unit 805 and the third detection unit 809 is disposed in opposition to the second sub-track unit 806.

The first light source 812 faces the first detection unit 807 with the reference track unit 804 of the scale unit 802 sandwiched in between. The second light source 813 faces the second detection unit 808 with the first sub-track unit 805 sandwiched in between and the third light source 814 faces the third detection unit 809 with the second sub-track unit 806 sandwiched in between. Then, the three light sources 812, 813, and 814 move in the first direction X in an interlocking manner with the detection head unit 803.

Light emitted from the first light source 812 passes through the reference track unit 804 and is received by the first detection unit 807. Light emitted from the second light source 813 passes through the first sub-track unit 805 and is received by the second detection unit 808 and light emitted from the third light source 814 passes through the second sub-track unit 806 and is received by the third detection unit 809.

On the light emission side of each of the three light sources 812, 813, and 814, a collimator lens 816 is disposed. The collimator lens 816 converts light emitted from the three light sources 812, 813, and 814 into parallel light. The light having passed through the track units 804, 805, and 806 of the scale unit 802 enters a light receiving device, not shown schematically, via a vernier, not shown schematically, of the detection units 807, 808, and 809 of the detection heat unit 803. By detecting a change in quantity of light, it is possible to obtain a sin signal and a cos signal. After this, as in the embodiment examples explained above, the amount of displacement in the first direction X and in the second direction Y and the amount of rotational displacement of the detection head unit 803 are detected.

The detection algorithm for detecting the amount of displacement in the first direction X and in the second direction Y and the amount of rotation displacement by the displacement detection apparatus 801 according to the ninth embodiment example is the same as the detection algorithm of the displacement detection apparatus 1 according to the first embodiment example, and therefore, its explanation is omitted here.

Other configurations are the same as those of the displacement detection apparatus 1 according to the first embodiment, and therefore, their explanation is omitted. By the displacement detection apparatus 801 having such a configuration, it is also possible to obtain the same working and effect as those of the displacement detection apparatus 1 according to the first embodiment example described above.

For the displacement detection apparatus 801 according to the ninth embodiment example, the example is explained, in which the scale unit 802 having a transmission grating is used, but, the example is not limited to this and a scale unit having a reflection grating may be used. In the case of the reflection grating, the detection head unit and the light source are disposed on the same plane side in the scale unit.

The present invention is not limited to the embodiments described above and shown in the drawings and there can be various modification embodiments within the scope not deviating from the gist of the invention described in the claims. For example, light irradiated from the light source may be supplied not only into the air but into a liquid or a vacuum apace.

What is claimed is:

1. A displacement detection apparatus comprising:
   a scale unit having a measurement plane provided with at least two track units having a scale whose repetition pitch is constant, wherein pitch directions, which are directions in which the repetition pitch in each of the at least two track units is the shortest, are different from one another; and
   a detection head unit having at least three or more detection units configured to read the scale and to output a signal in accordance with the read scale, wherein
   one of the at least two track units is a reference track unit and for the reference track unit, the at least one detection unit is arranged in opposition thereto,
   the remaining track unit (s) of the at least two track units is a sub-track unit,
   for the sub-track unit, the at least one detection unit is arranged in opposition thereto, and
   when the scale unit and the detection head unit move relatively along the measurement plane of the scale unit, the at least three or more detection units detect displacement in two orthogonal directions on a plane parallel to the plane along which the detection head unit moves.

2. The displacement detection apparatus according to claim 1, wherein
   the scale unit has the reference track unit and the two sub-track units,
   the pitch directions of the two sub-track units are set in the same direction,
   the pitch direction of the reference track unit is set in a direction different from the pitch directions of the two sub-track units, and
   the reference track unit is arranged between the two sub-track units.

3. The displacement detection apparatus according to claim 1, wherein
   the pitch direction of the reference track unit is parallel to one of two orthogonal directions on a plane parallel to the plane along which the detection head unit moves.

4. The displacement detection apparatus according to claim 1, wherein
   the pitch direction of the reference track unit and the pitch directions of the sub-track units are line-symmetric with respect to a boundary line between the reference track unit and the sub-track units.

5. The displacement detection apparatus according to claim 1, wherein
   the detection head unit detects an amount of rotational displacement around an axis, which is a normal of a plane parallel to the plane along which the detection head unit moves based on detection results of the at least three or more detection units.

6. The displacement detection apparatus according to claim 5, wherein
   displacement in the two orthogonal directions on a plane parallel to the plane along which the detection head unit moves is corrected based on the amount of rotational displacement.

* * * * *